(12) United States Patent
Carey et al.

(10) Patent No.: US 8,137,233 B2
(45) Date of Patent: Mar. 20, 2012

(54) WRAP-AROUND DRIVELINE WITH MULTI-SPEED TRANSMISSION

(75) Inventors: Clinton E. Carey, Monroe, MI (US);
Scott H. Wittkopp, Ypsilanti, MI (US);
James M. Hart, Belleville, MI (US);
Andrew W. Phillips, Saline, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 908 days.

(21) Appl. No.: 12/178,705

(22) Filed: Jul. 24, 2008

(65) Prior Publication Data

US 2009/0192005 A1    Jul. 30, 2009

Related U.S. Application Data

(60) Provisional application No. 61/023,206, filed on Jan. 24, 2008, provisional application No. 61/023,204, filed on Jan. 24, 2008, provisional application No. 61/023,202, filed on Jan. 24, 2008, provisional application No. 61/023,113, filed on Jan. 24, 2008, provisional application No. 61/023,111, filed on Jan. 24, 2008.

(51) Int. Cl.
*F16H 3/44* (2006.01)

(52) U.S. Cl. .......................... 475/286; 475/317

(58) Field of Classification Search ................... 475/269, 475/275, 286, 296, 317, 323, 330
See application file for complete search history.

(56) References Cited

U.S. PATENT DOCUMENTS

| 5,167,593 | A | 12/1992 | Pierce | |
|---|---|---|---|---|
| 5,618,242 | A | 4/1997 | Wu | |
| 7,416,508 | B1 * | 8/2008 | Carey et al. | 475/275 |
| 7,416,509 | B1 * | 8/2008 | Carey et al. | 475/275 |
| 7,422,539 | B1 * | 9/2008 | Carey et al. | 475/275 |
| 7,695,394 | B2 * | 4/2010 | Phillips et al. | 475/275 |
| 7,824,297 | B2 * | 11/2010 | Carey et al. | 475/275 |
| 2006/0270516 | A1 * | 11/2006 | Klemen | 475/280 |
| 2007/0238573 | A1 | 10/2007 | Kamm et al. | |

* cited by examiner

*Primary Examiner* — Justin Holmes
(74) *Attorney, Agent, or Firm* — Quinn Law Group, PLLC

(57) ABSTRACT

A vehicle driveline includes a multi-speed transmission that has four planetary gear sets having continuous interconnections and five torque-transmitting mechanisms selectively engagable to establish eight forward and at least one reverse speed ratio between the transmission input member and the transmission output member. The transmission input and output members define an axis of rotation parallel to an axis of rotation of an engine output member that drives the transmission. At least one rotatable element transfers torque from the engine output member to the transmission input member. The torque-transmitting mechanisms are packaged in different ones of six possible zones within the transmission casing. An additional, final drive planetary gear set and a differential mechanism are also included in the driveline.

26 Claims, 10 Drawing Sheets

| CLUTCH | ZONES | | | | | |
|---|---|---|---|---|---|---|
| | I | II | III | IV | V | VI |
| 860 | O | O | O | O | O | O |
| 862 | X | X | X | O | O | O |
| 864 | X | X | O | X | O | X |
| 866 | X | O | O | O | O | X |
| 868 | X | X | X | X | X | X |

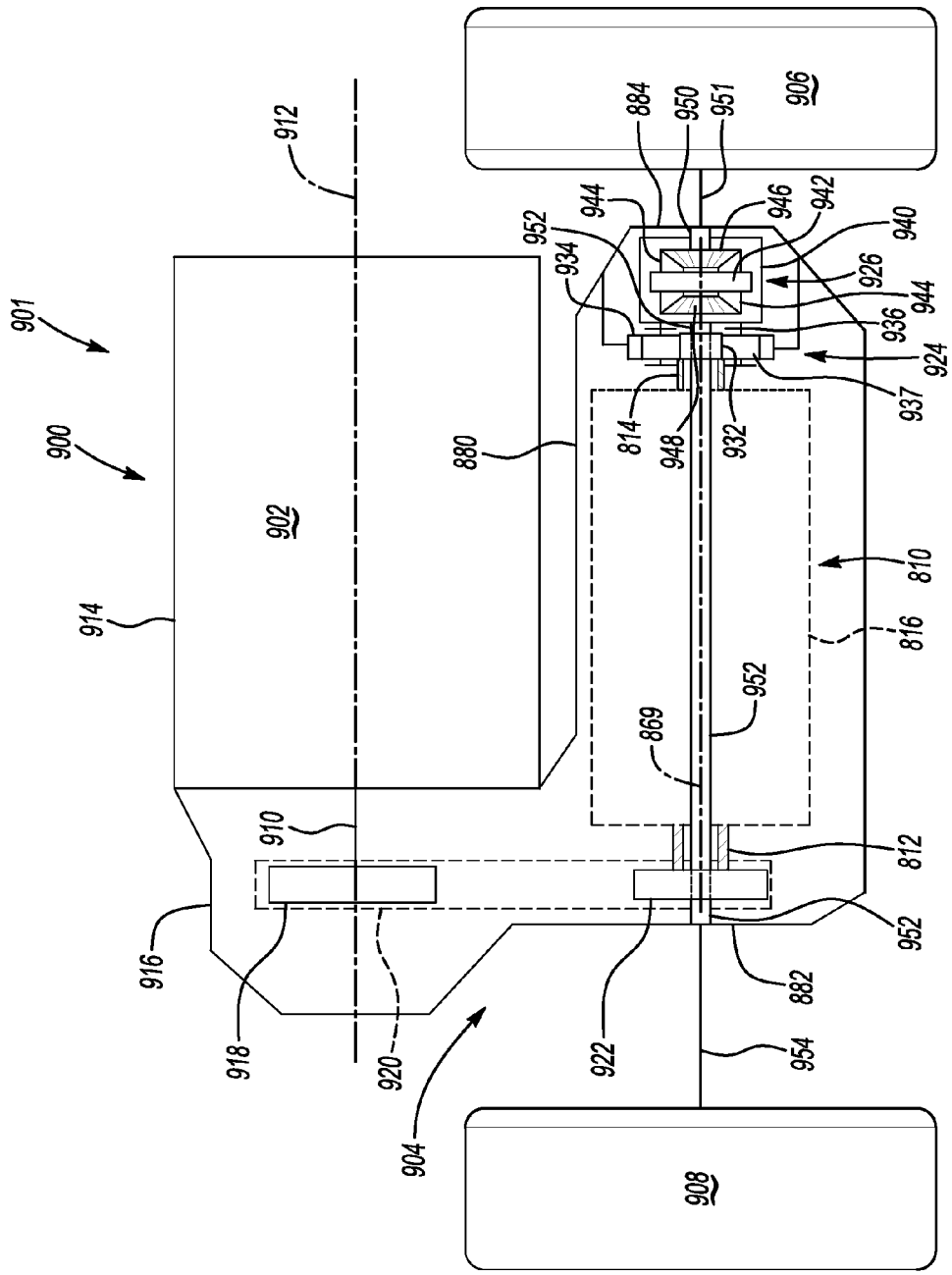

US 8,137,233 B2

WRAP-AROUND DRIVELINE WITH MULTI-SPEED TRANSMISSION

CROSS-REFERENCE TO RELATED APPLICATIONS

This application claims the benefit of U.S. Provisional Application 61/023,206, filed Jan. 24, 2008, which is hereby incorporated by reference in its entirety. This application claims the benefit of U.S. Provisional Application 61/023, 204, filed Jan. 24, 2008, which is hereby incorporated by reference in its entirety. This application claims the benefit of U.S. Provisional Application 61/023,202, filed Jan. 24, 2008, which is hereby incorporated by reference in its entirety. This application claims the benefit of U.S. Provisional Application 61/023,113, filed Jan. 24, 2008, which is hereby incorporated by reference in its entirety. This application claims the benefit of U.S. Provisional Application 61/023,111, filed Jan. 24, 2008, which is hereby incorporated by reference in its entirety.

TECHNICAL FIELD

This invention relates to a driveline for a vehicle including a multi-speed transmission defining a transmission axis parallel to and spaced from an engine axis of an engine driving the transmission.

BACKGROUND OF THE INVENTION

Multi-speed transmissions in automotive vehicles provide operating efficiency and smooth feel in shifting events. Multiple planetary gear sets have been utilized to provide eight or more forward speed ratios with relatively efficient packaging due to the compact nature of planetary gear sets. A number of selectively engagable torque-transmitting mechanisms are controlled to interconnect different members of the planetary gear sets with one another, with the transmission casing, or sometimes with the transmission input or output member to achieve the various speed ratios. Efficient packaging of the torque-transmitting mechanisms helps to minimize the overall dimensions of the transmission, potentially allowing its use in more vehicle platforms, reducing weight, and minimizing manufacturing complexity. Additionally, the transmission must be arranged relative to the engine or other power plant to provide driving torque to the vehicle wheels.

SUMMARY OF THE INVENTION

A powertrain is provided that includes a driveline for transferring torque from an engine output member of an engine to front wheels of a vehicle via a transmission that has coaxial transmission input and output members aligned with each other and with the vehicle wheels, and that define and rotate about a transmission axis. The engine output member defines and rotates about an engine axis that is spaced parallel with the transmission axis. The driveline includes a rotatable element, such as a chain, that transfers torque from the engine output member to the transmission input member. Thus, the driveline "wraps around" the engine to deliver torque to the wheels. A final drive planetary gear set and a differential mechanism transfer torque from the transmission output member to the vehicle wheels. A drive shaft runs through the transmission coaxially with the transmission axis to transfer torque from the differential mechanism to one of the front wheels, i.e., the front wheel located on the opposite side of the transmission from the differential mechanism.

The multi-speed transmission has four planetary gear sets, each having a first, a second and a third rotatable member. Certain pairs of the members are continuously connected for common rotation. Specifically, the second member of the first planetary gear set is continuously connected for common rotation with the first member of the second planetary gear set. The second member of the second planetary gear set is continuously connected for common rotation with the first member of the third planetary gear set. The second member of the third planetary gear set is continuously connected for common rotation with the first member of the fourth planetary gear set. The third member of the third planetary gear set is continuously connected for common rotation with the third member of the fourth planetary gear set. The third member of the first planetary gear set is grounded to the transmission casing. Preferably, an input member is continuously connected for common rotation with the first member of the first planetary gear set and an output member is continuously interconnected for common rotation with the first member of the fourth planetary gear set.

Five torque-transmitting mechanisms are selectively engagable to connect selected members of the planetary gear sets for common rotation. The five torque-transmitting mechanisms are engagable in different combinations to achieve eight forward speed ratios and a reverse speed ratio between the input member and the output member.

A transmission casing surrounds the planetary gear sets and torque-transmitting mechanisms and defines a cavity having six different zones. The transmission casing includes opposing first and second end walls and a housing portion. As used herein, a "zone" is a portion of the cavity. A first zone extends axially from the first end wall to one of the planetary gear sets. A second, a third, and a fourth zone each extend between different adjacent pairs of the planetary gear sets. A fifth zone extends from another one of the planetary gear sets to the second end wall. Each of the first, second, third, fourth, and fifth zones extend radially to an outer surface of a radially outermost one of the members. A sixth zone borders the first, second, third, fourth and fifth zones, extends radially outward to the housing portion and extends axially between the first and second walls.

Each torque-transmitting mechanism may be located in selected ones of the zones for which it is determined that such location would further the goals of (i) minimizing the overall size of the transmission, (ii) reducing weight, (iii) providing a convenient location for hydraulic feed to the torque-transmitting mechanism, such as by locating the torque-transmitting mechanism close to the transmission casing or to a centrally-located shaft, both of which typically define at least part of a feed path to supply hydraulic fluid to torque-transmitting mechanisms, and (iv) reducing the overall complexity (e.g., the number, shape and size of hub members and other interconnecting members used to connect members of the planetary gear sets with one another or with the transmission casing).

The five torque-transmitting mechanisms may include four rotating-type clutches and one stationary-type clutch, with the stationary-type clutch grounding the second member of the fourth planetary gear set to the transmission housing. In another embodiment, the five torque-transmitting mechanisms may all be rotating-type clutches.

Preferably, the first, second, and third members of each planetary gear set are a ring gear member, a carrier member, and a sun gear member, although not necessarily in that order. Preferably, the input member is continuously interconnected for common rotation with the carrier member of the first planetary gear set; the ring gear member of the first planetary gear set is continuously connected for common rotation with the sun gear member of the second planetary gear set; the ring gear member of the third planetary gear set is continuously connected for common rotation with the carrier member of the fourth planetary gear set; the sun gear member of the first planetary gear set is grounded to the transmission casing; the ring gear member of the second planetary gear set is continuously connected for common rotation with the carrier member of the third planetary gear set; the sun gear member of the third planetary gear set is continuously connected for common rotation with the sun gear member of the fourth planetary gear set; and the output member is continuously connected for common rotation with the carrier member of the fourth planetary gear set.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 10 is a schematic partially cross-sectional illustration of a powertrain including an engine connected with a driveline that includes the transmission of FIG. 9A to provide power to front vehicle wheels.

DESCRIPTION OF THE PREFERRED EMBODIMENTS

Figures 1A, 1B:
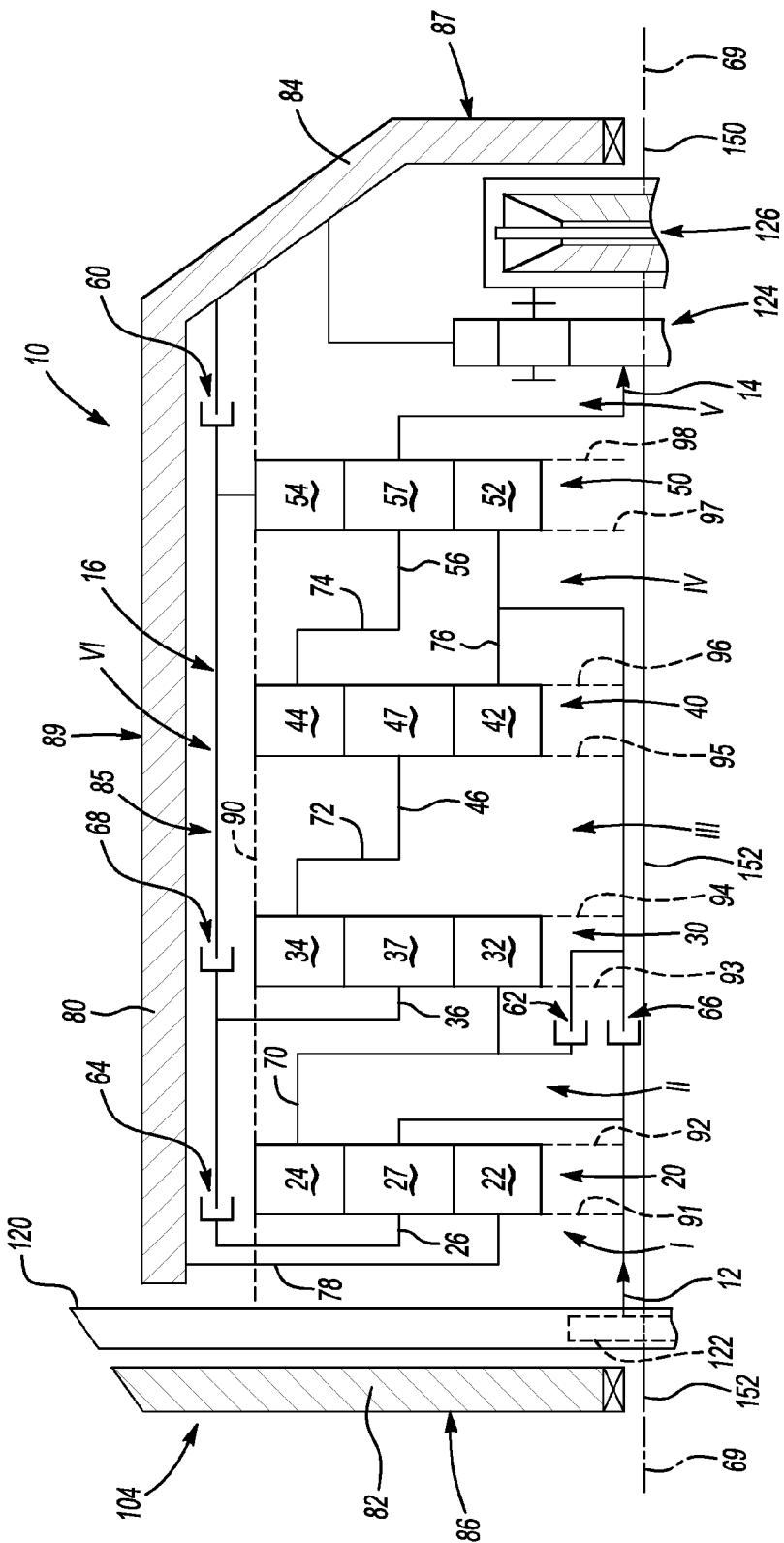
FIG. 1A is a schematic, cross-sectional, partially fragmentary illustration of a first embodiment of a multi-speed transmission within the scope of the invention showing different zones within the transmission.
FIG. 1B is a chart listing the selected zones in which various torque-transmitting mechanisms of the transmission of FIG. 1A may be located.

Referring to the drawings, wherein like reference numbers refer to like components, FIG. 1A shows a transmission 10 having a transmission input member 12 for receiving power from a power source such as an internal combustion engine and a transmission output member 14 for delivering power to a final drive mechanism such as the wheels of a vehicle. The transmission 10 includes a gearing arrangement 16 having four planetary gear sets 20, 30, 40 and 50 and five selectively engagable torque-transmitting mechanisms 60, 62, 64, 66, and 68. Only that portion of the transmission 10 above an axis of rotation 69 (referred to as a transmission axis) of the input and output members 12, 14 is shown. Those skilled in the art will recognize that the planetary gear sets 20, 30, 40 and 50 as well as torque-transmitting mechanisms 60, 62, 64, 66, and 68 are symmetrical about the axis of rotation 69.

Figure 2:
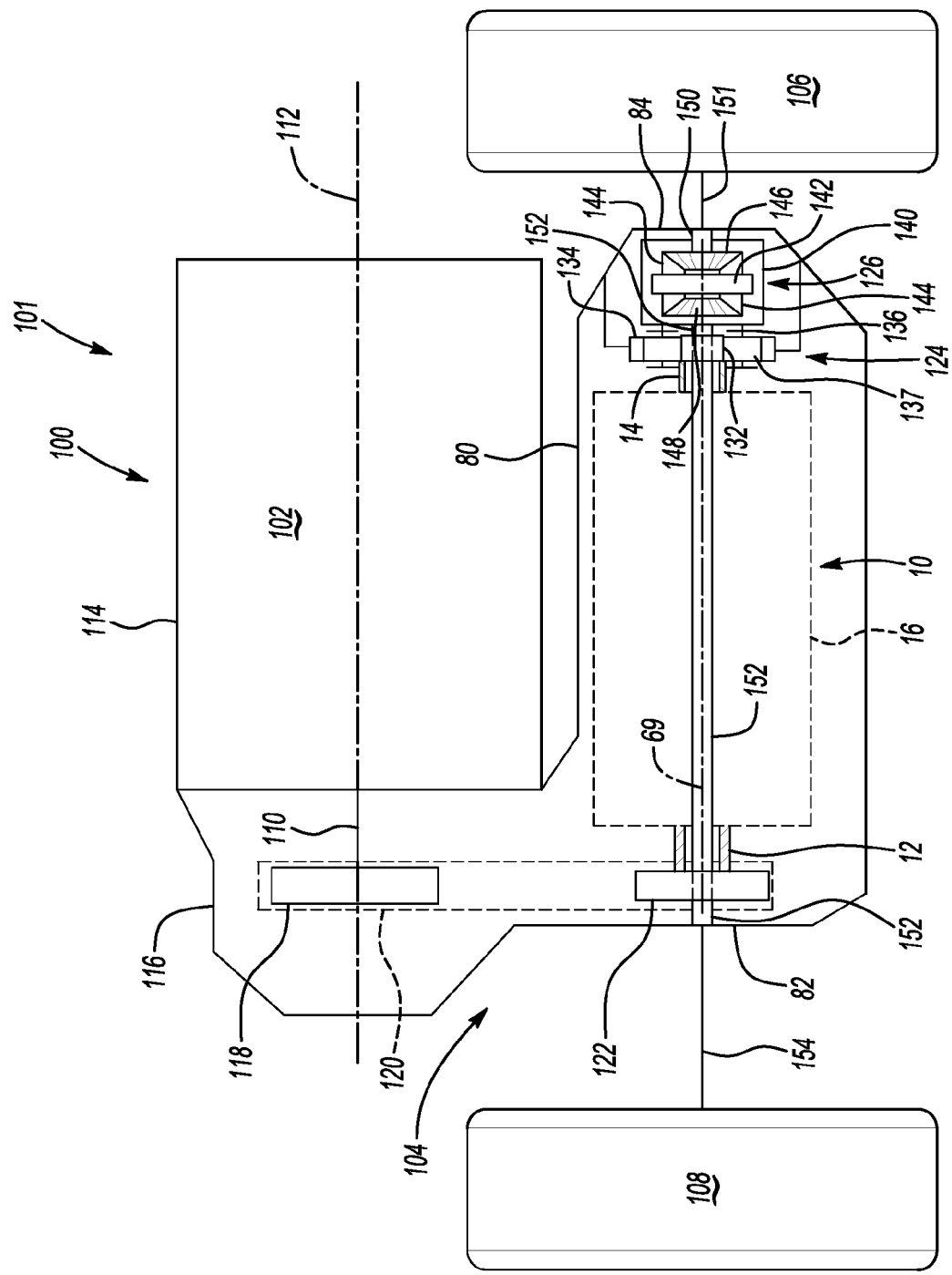
FIG. 2 is a schematic partially cross-sectional illustration of a powertrain including an engine connected with a driveline that includes the transmission of FIG. 1A to provide power to front vehicle wheels.

The transmission 10 is part of a powertrain 100 of a vehicle 101 illustrated in FIG. 2. The powertrain 100 includes an engine 102 and a driveline 104. The engine 102 transfers torque to the driveline 104 to deliver driving torque to first and second front wheels, 106, 108, respectively. The driveline 104 includes the transmission 10 and will be described in detail hereinafter with respect to FIG. 2.

Referring to FIG. 1A, each planetary gear set 20, 30, 40 and 50 includes concentric rotatable components. Specifically, planetary gear set 20 includes a sun gear member 22, a ring gear member 24 and a carrier member 26 that rotatably supports a plurality of pinion gears 27 that intermesh with both the sun gear member 22 and the ring gear member 24. Planetary gear set 30 includes a sun gear member 32, a ring gear member 34 and a carrier member 36 that rotatably supports a plurality of pinion gears 37 that intermesh with both the sun gear member 32 and the ring gear member 34. Planetary gear set 40 includes a sun gear member 42, a ring gear member 44 and a carrier member 46 that rotatably supports a plurality of pinion gears 47 that intermesh with both the sun gear member 42 and the ring gear member 44. Planetary gear set 50 includes a sun gear member 52, a ring gear member 54 and a carrier member 56 that rotatably supports a plurality of pinion gears 57 that intermesh with both the sun gear member 52 and the ring gear member 54.

In the embodiment of FIG. 1A, planetary gear set 20 is the first planetary gear set, planetary gear set 30 is the second planetary gear set, planetary gear set 40 is the third planetary gear set, and planetary gear set 50 is the fourth planetary gear set.

The transmission input member 12 is continuously connected for common rotation with carrier member 26. The transmission output member 14 is continuously connected for common rotation with carrier member 56. An interconnecting member 70 continuously interconnects ring gear member 24 for common rotation with sun gear member 32. An interconnecting member 72 continuously interconnects ring gear member 34 for common rotation with carrier member 46. An interconnecting member 74 continuously interconnects ring gear member 44 for common rotation with carrier member 56. An interconnecting member 76 continuously interconnects sun gear member 42 for common rotation with sun gear member 52. Each of the interconnecting members 70, 72, 74 and 76 may be one component or multiple components. The sun gear member 22 is continuously grounded to a housing 80 (also referred to herein as a housing portion) of the transmission 10 via a radially-extending structural member 78. The housing 80 circumferentially surrounds the gear sets 20, 30, 40 and 50 as well as the torque-transmitting mechanisms 60, 62, 64, 66 and 68. The transmission 10 further includes a first end wall 82 generally at one end of the transmission 10 and a second end wall 84 generally at an opposing end of the transmission 10. The housing 80 joins the first and second end walls 82, 84. It should be appreciated that the housing 80 and the first and second end walls 82, 84 form a transmission casing and may be integrated, or may each be a separate component or components of the casing. The transmission casing will be referred to herein as 80, 82, 84. The transmission casing 80, 82, 84 defines a cavity 85. The end walls 82 and 84 enclose the cavity 85 axially, but are likely a conical or irregular shape rather than a planar shape as schematically depicted.

The planetary gear sets 20, 30, 40, and 50 and torque-transmitting mechanisms 60, 62, 64, 66 and 68 are located in the cavity 85. The transmission casing 80, 82, 84 and the planetary gear sets 20, 30, 40, and 50 cooperate to define six spaces or zones I-VI within the cavity 85. A first zone I is defined between an outer surface 86 of the first end wall 82 and a plane 91 running generally parallel with a side of the planetary gear set 20 adjacent the first end wall 82, and runs radially outward to a circumferential boundary 90 running along a radially-outermost surface of each of the ring gear members 24, 34, 44 and 54. A second zone II is defined between a plane 92 running generally parallel along a side of the planetary gear set 20 facing the planetary gear set 30, a plane 93 running generally parallel along a side of the planetary gear set 30 facing the planetary gear set 20 and the circumferential boundary 90. A third zone III is defined between a plane 94 running generally parallel along a side of the planetary gear set 30 facing the planetary gear set 40, a plane 95 running generally parallel along a side of the planetary gear set 40 facing the planetary gear set 30 and the circumferential boundary 90. A fourth zone IV is defined between a plane 96 running generally parallel along a side of the planetary gear set 40 facing the planetary gear set 50, a plane 97 running generally parallel along a side of the planetary gear set 50 facing the planetary gear set 40 and the circumferential boundary 90. A fifth zone V is defined between a plane 98 running generally parallel along a side of the planetary gear set 50 facing the second end wall 84, an outer surface 87 of the second end wall 84 and the circumferential boundary 90. A sixth zone VI is defined between the circumferential boundary 90, an outer surface 89 of the housing 80, and the outer surfaces 86 and 87 of the first and second end walls 82 and 84, respectively. The structural member 78 traverses zones I and VI.

Torque-transmitting mechanisms 62, 64, 66 and 68 are rotating-type clutches and torque-transmitting mechanism 60 is a brake, also referred to as a reaction clutch or a stationary clutch. Torque-transmitting mechanism 60 is selectively engagable to ground ring gear member 54 to transmission casing 80, 82, 84. The torque-transmitting mechanism 62 is selectively engagable to connect the ring gear member 24 for common rotation with the sun gear members 42 and 52. The torque-transmitting mechanism 64 is selectively engagable to connect the carrier member 26 for common rotation with the carrier member 36. The torque-transmitting mechanism 66 is selectively engagable to connect the transmission input member 12 and the carrier member 26 for common rotation with the sun gear members 42 and 52. The torque-transmitting mechanism 68 is selectively engagable to connect the carrier member 36 for common rotation with ring gear member 54.

The transmission 10 provides eight forward speed ratios and one reverse speed ratio between the transmission input member 12 and the transmission output member 14. Specifically, a reverse speed ratio is established by engaging torque-transmitting mechanisms 60 and 68; a first forward speed ratio is established by engaging torque-transmitting mechanisms 60 and 66; a second forward speed ratio is established by engaging torque-transmitting mechanisms 60 and 62; a third forward speed ratio is established by engaging torque-transmitting mechanisms 60 and 64; a fourth forward speed ratio is established by engaging torque-transmitting mechanisms 62 and 64; a fifth forward speed ratio is established by engaging torque-transmitting mechanisms 64 and 66; a sixth forward speed ratio is established by engaging torque-transmitting mechanisms 64 and 68; a seventh forward speed ratio is established by engaging torque-transmitting mechanisms 66 and 68; and an eighth forward speed ratio is established by engaging torque-transmitting mechanisms 62 and 68. Thus, all upshifts and downshifts between subsequent speed ratios are single transition shifts. Those skilled in the art will recognize that the combinations of torque-transmitting mechanisms described above provide eight different numerical speed ratios and a reverse speed ratio. Preferably, in all embodiments of the invention, the tooth ratios are selected so that at least two of the speed ratios are overdrive ratios.

As shown in FIG. 1A, torque-transmitting mechanisms 62 and 66 are located in zone II; and torque-transmitting mechanisms 60, 64 and 68 are located in zone VI. Alternatively, the interconnections between the various gear members, the transmission input member 12, the transmission output member 14 and the transmission casing 80, 82, 84 obtained by selective engagement of the various torque-transmitting mechanisms 60, 62, 64, 66 and 68 as described above are possible with the torque-transmitting mechanisms 60, 62, 64, 66 and 68 disposed in other zones as shown in the chart of FIG. 1B. An "X" in the chart of FIG. 1B indicates that the particular torque-transmitting mechanism is positionable in the referenced zone and an "O" indicates that the particular torque-transmitting mechanisms are not to be located in the referenced zone. It should be appreciated that the selection of location for the torque-transmitting mechanism of each row in the chart of FIG. 1B is feasible independently of the other rows. Accordingly, torque-transmitting mechanism 60 is locatable in any of four of the six possible zones; torque-transmitting mechanism 62 is locatable in any of three of the six possible zones; torque-transmitting mechanism 64 is locatable in any of three of the six possible zones; torque transmitting mechanism 66 is locatable in any of four of the six possible zones; and torque-transmitting mechanism 68 is locatable in any of five of the six possible zones.

Referring to FIG. 2, the driveline 104 is referred to as a "wrap-around" driveline as it wraps around one end of the engine 102 and under the engine 102 in a transaxle arrangement aligned with the front wheels 106, 108. Specifically, the engine has an engine output member 110 for delivering driving torque. The engine output member 110 rotates about and defines an engine axis 112. The engine output member 110 extends through the engine case 114 into a portion of casing 116 that is either separate from or integrated with the transmission casing 80, 82, 84. A rotatable drive sprocket or gear 118 rotates concentrically about and commonly with the engine output member 110. A rotatable element 120, which in this embodiment is an endless transfer element, transfers engine torque from the drive sprocket 118 to a drive sprocket or gear 122 that rotates concentrically about and commonly with the transmission input member 12, shown in cross-sectional view to indicate that the transmission input member 12 is a tubular shaft surrounding a drive shaft 152 that is concentric with the transmission input member 12. Both the transmission input member 12 and the drive shaft 152, as well as the transmission output member 14, rotate about the transmission axis 69. Thus, the rotatable element 120 transfers torque from the engine 102 to the transmission 10, and allows the engine axis 112 and the transmission axis 69 to be arranged parallel with one another, both running laterally with respect to the vehicle 101, with the transmission axis 69, the transmission input member 12, and transmission output member 14 being aligned and coaxial with the front wheels 106, 108. The rotatable element 120 may be a chain or belt.

The gearing arrangement 16 is indicated only schematically in FIG. 2 as generally being in the area indicated by the dashed box, between the transmission input member 12 and the transmission output member 14, with the transmission input member 12 and transmission output member 14 connected for rotation with different members of the gearing arrangement 16 as shown and described with respect to FIG. 1A.

The driveline 104 further includes an additional planetary gear set 124, also referred to as a final drive planetary gear set, as well as a differential mechanism 126, each of which are arranged concentrically and coaxially with the transmission axis 69 and transfer torque from the transmission output member 14 to the wheels 106, 108 as described below. Although depicted as a bevel-type differential mechanism in FIG. 2, the differential mechanism 126 may alternatively be a compound planetary gear set.

The final drive planetary gear set 124 includes a sun gear member 132, a ring gear member 134 and a carrier member 136 that rotatably supports a plurality of pinion gears 137 that intermesh with both the sun gear member 132 and the ring gear member 134. The sun gear member 132 is connected for common rotation with the transmission output member 14. The ring gear member 134 is grounded to the transmission casing 80.

The differential mechanism 126 includes a carrier member 140 that rotates with and supports a pinion shaft 142 on which pinion gears 144 rotate commonly. The carrier member 140 is connected for common rotation with the carrier member 136 of the final drive planetary gear set 124 and is referred to herein as the first member of the differential gear set 126. The carrier member 140 also supports side gears 146 and 148, both of which mesh with the pinion gears 144. The side gear 146, referred to as the second member of the differential gear set 126, is connected for rotation with a drive shaft 150 which delivers driving torque to wheel 106 via wheel axle 151. The wheel axle 151 may be connected for common rotation with drive shaft 150 or may be integrally formed as a unitary component with the drive shaft 150. The side gear 148, referred to as the third member of the differential gear set 126, is connected for common rotation with a drive shaft 152 which delivers driving torque to wheel 108 via wheel axle 154. The wheel axle 154 may be connected for common rotation with drive shaft 152 or may be integrally formed as a unitary component with the drive shaft 152. Both of the drive shafts 150, 152 are concentric and coaxial with the transmission axis 69. The drive shaft 152 passes through a central opening in the sun gear member 132 of the final drive planetary gear set 124, the tubular transmission output member 14, the transmission gearing arrangement 16, the tubular transmission input member 12, and the rotatable element 120 and a central opening in the sprocket 122 before connecting for common rotation with wheel axle 154.

Accordingly, the driveline 104 is arranged to wrap around the engine 102, with the transmission 10 arranged on a transverse axis (transmission axis 69) parallel with an axis 112 of the engine 102, with the transmission input member 12 and the transmission output member 14 arranged at opposing ends of the transmission 10, coaxial with one another. The transmission 10 delivers torque to the front wheels 106, 108 at eight forward speed ratios and a reverse speed ratio by engaging five torque-transmitting mechanisms 60, 62, 64, 66 and 68 in various combinations. The torque-transmitting mechanisms 60, 62, 64, 66 and 68 may be located in a variety of different zones defined by the transmission 10, as described above. Thus, a compact front-wheel drive transmission 10 is conveniently packaged as part of a wrap-around driveline 104.

Figures 3A, 3B:
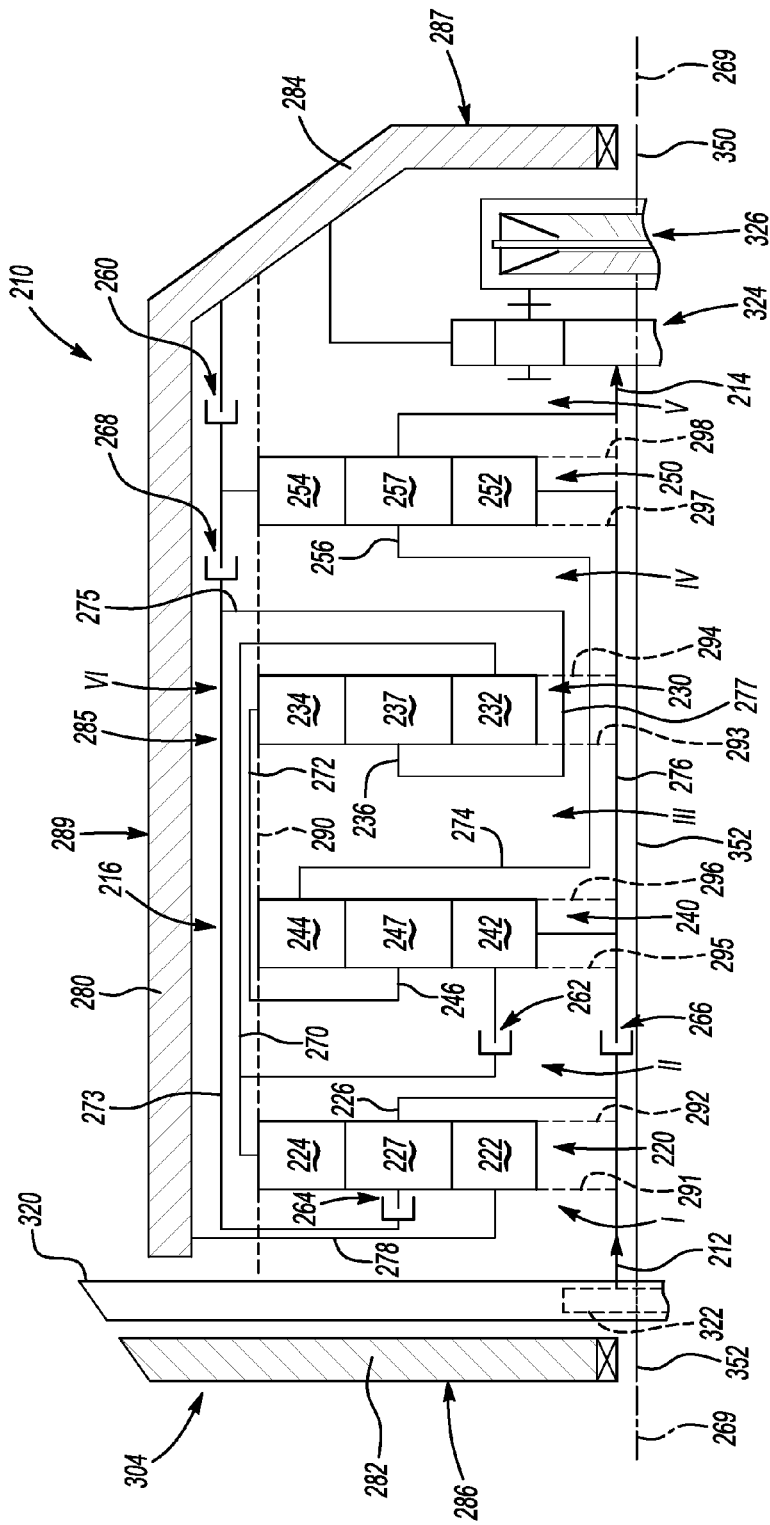
FIG. 3A is a schematic, cross-sectional, partially fragmentary illustration of a first embodiment of a multi-speed transmission within the scope of the invention showing different zones within the transmission.
FIG. 3B is a chart listing the selected zones in which various torque-transmitting mechanisms of the transmission of FIG. 3A may be located.

FIG. 3A shows a transmission 210 within the scope of the invention having a transmission input member 212 for receiving power from a power source such as an internal combustion engine and a transmission output member 214 for delivering power to a final drive mechanism such as the wheels of a vehicle. The transmission 210 includes a gearing arrangement 216 having four planetary gear sets 220, 230, 240 and 250 and five selectively engagable torque-transmitting mechanisms 260, 262, 264, 266 and 268. Only that portion of the transmission 210 above an axis of rotation 269 (referred to as a transmission axis) of the input and output members 212, 214 is shown. Those skilled in the art will recognize that the planetary gear sets 220, 230, 240 and 250 as well as torque-transmitting mechanisms 260, 262, 264, 266, and 268 are symmetrical about the axis of rotation 269.

Figure 4:
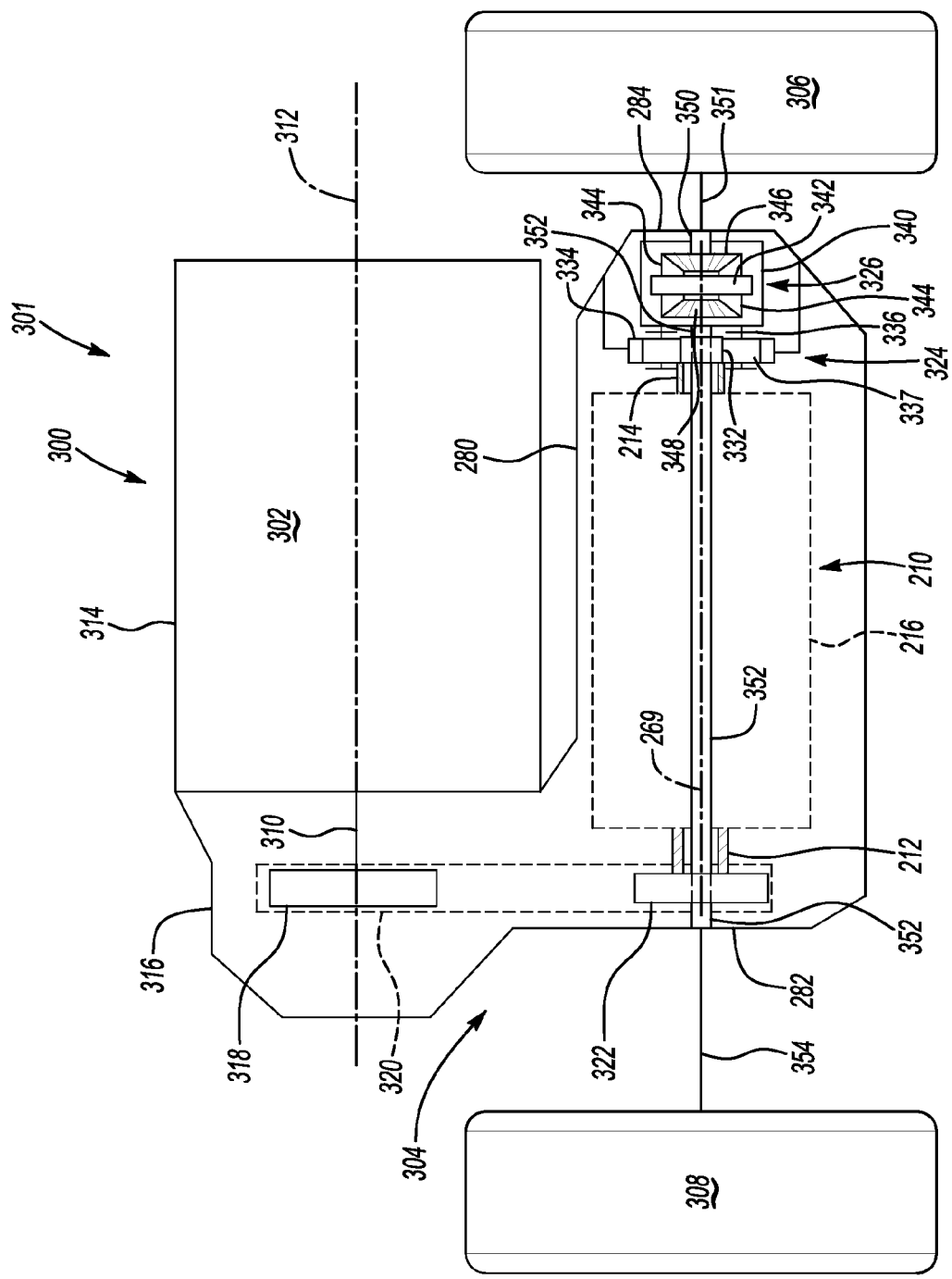
FIG. 4 is a schematic partially cross-sectional illustration of a powertrain including an engine connected with a driveline that includes the transmission of FIG. 3A to provide power to front vehicle wheels.

The transmission 210 is part of a powertrain 300 of a vehicle 301 illustrated in FIG. 4. The powertrain 300 includes an engine 302 and a driveline 304. The engine 302 transfers torque to the driveline 304 to deliver driving torque to first and second front wheels, 306, 308, respectively. The driveline 304 includes the transmission 210 and will be described in detail hereinafter with respect to FIG. 4.

Referring to FIG. 3A, each planetary gear set 220, 230, 240 and 250 includes concentric rotatable components. Specifically, planetary gear set 220 includes a sun gear member 222, a ring gear member 224 and a carrier member 226 that rotatably supports a plurality of pinion gears 227 that intermesh with both the sun gear member 222 and the ring gear member 224. Planetary gear set 230 includes a sun gear member 232, a ring gear member 234 and a carrier member 236 that rotatably supports a plurality of pinion gears 237 that intermesh with both the sun gear member 232 and the ring gear member 234. Planetary gear set 240 includes a sun gear member 242, a ring gear member 244 and a carrier member 246 that rotatably supports a plurality of pinion gears 247 that intermesh with both the sun gear member 242 and the ring gear member 244. Planetary gear set 250 includes a sun gear member 252, a ring gear member 254 and a carrier member 256 that rotatably supports a plurality of pinion gears 257 that intermesh with both the sun gear member 252 and the ring gear member 254.

In the embodiment of FIG. 3A, planetary gear set 220 is the first planetary gear set, planetary gear set 230 is the second planetary gear set, planetary gear set 240 is the third planetary gear set, and planetary gear set 250 is the fourth planetary gear set.

The transmission input member 212 is continuously connected for common rotation with carrier member 226. The transmission output member 214 is continuously connected for common rotation with carrier member 256. A first interconnecting member 270 continuously interconnects ring gear member 224 for common rotation with sun gear member 232. A second interconnecting member 272 continuously interconnects carrier member 246 for common rotation with ring gear member 234. A third interconnecting member 274 continuously interconnects ring gear member 244 for common rotation with carrier member 256. A fourth interconnecting member 276 continuously interconnects sun gear member 242 for common rotation with sun gear member 252. Each of the interconnecting members 270, 272, 274 and 276 may be one component or multiple components. The sun gear member 222 is continuously grounded to a housing 280 (also referred to herein as a housing portion) of the transmission 210 via a radially-extending structural member 278. The housing 280 circumferentially surrounds the gear sets 220, 230, 240 and 250 as well as the torque-transmitting mechanisms 260, 262, 264, 266 and 268. The transmission 210 further includes a first end wall 282 generally at one end of the transmission 210 and a second end wall 284 generally at an opposing end of the transmission 210. The housing 280 joins the first and second end walls 282, 284. It should be appreciated that the housing 280 and the first and second end walls 282, 284 form a transmission casing and may be integrated or separate components of the casing. The transmission casing will be referred to herein as 280, 282, 284. The transmission casing 280, 282, 284 defines a cavity 285. The end walls 282 and 284 enclose the cavity 285 axially, but are likely a conical or irregular shape rather than a planar shape as schematically depicted.

The planetary gear sets 220, 230, 240, and 250 and torque-transmitting mechanisms 260, 262, 264, 266 and 268 are located in the cavity 285. The transmission casing 280, 282, 284 and the planetary gear sets 220, 230, 240, and 250 cooperate to define six spaces or zones I-VI within the cavity 285. A first zone I is defined between an outer surface 286 of the first end wall 282 and a plane 291 running generally parallel with a side of the planetary gear set 220 adjacent the first end wall 282, and runs radially outward to a circumferential boundary 290 running along a radially-outermost surface of each of the ring gear members 224, 234, 244 and 254. A second zone II is defined between a plane 292 running generally parallel along a side of the planetary gear set 220 facing the planetary gear set 240, a plane 295 running generally parallel along a side of the planetary gear set 240 facing the planetary gear set 220 and the circumferential boundary 290. A third zone III is defined between a plane 296 running generally parallel along a side of the planetary gear set 240 facing the planetary gear set 230, a plane 293 running generally parallel along a side of the planetary gear set 230 facing the planetary gear set 240 and the circumferential boundary 290. A fourth zone IV is defined between a plane 294 running generally parallel along a side of the planetary gear set 230 facing planetary gear set 250, a plane 297 running generally parallel along a side of the planetary gear set 250 facing planetary gear set 240 and the circumferential boundary 290. A fifth zone V is defined between a plane 298 running generally parallel along a side of the planetary gear set 250 facing the second end wall 284, an outer surface 287 of the second end wall 284 and the circumferential boundary 290. A sixth zone IV is defined between the circumferential boundary 290, an outer surface 289 of the housing 280, and the outer surfaces 286 and 287 of the first and second end walls 282 and 284, respectively. The structural member 278 traverses zones I and VI.

Torque-transmitting mechanisms 262, 264, 266 and 268 are rotating-type clutches and torque-transmitting mechanism 260 is a brake, also referred to as a reaction clutch. Torque-transmitting mechanism 260 is selectively engagable to ground the ring gear member 254 to the transmission casing 280, 282, 284. The torque-transmitting mechanism 262 is selectively engagable to connect the ring gear member 224 and the sun gear member 232 for common rotation with the sun gear member 242. The torque-transmitting mechanism 264 is selectively engagable to connect the carrier member 226 for common rotation with the carrier member 236. The torque-transmitting mechanism 266 is selectively engagable to connect the input member 212 and the carrier member 226 for common rotation with the sun gear member 242 and the sun gear member 252. The torque-transmitting mechanism 268 is selectively engagable to connect the carrier member 236 for common rotation with the ring gear member 254.

The transmission 210 provides eight forward speed ratios and one reverse speed ratio between the transmission input member 212 and the transmission output member 214. Specifically, a reverse speed ratio is established by engaging torque-transmitting mechanisms 260 and 268; a first forward speed ratio is established by engaging torque-transmitting mechanisms 260 and 266; a second forward speed ratio is established by engaging torque-transmitting mechanisms 260 and 262; a third forward speed ratio is established by engaging torque-transmitting mechanisms 260 and 264; a fourth forward speed ratio is established by engaging torque-transmitting mechanisms 262 and 264; a fifth forward speed ratio is established by engaging torque-transmitting mechanisms 264 and 266; a sixth forward speed ratio is established by engaging torque-transmitting mechanisms 264 and 268; a seventh forward speed ratio is established by engaging torque-transmitting mechanisms 266 and 268; and an eighth forward speed ratio is established by engaging torque-transmitting mechanisms 262 and 268. Thus, single transition upshifts and downshifts are used between subsequent speed ratios.

As shown in FIG. 3A, torque-transmitting mechanism 264 is located in zone I; torque-transmitting mechanisms 262 and 266 are located in zone II; and torque-transmitting mechanisms 260 and 268 are located in zone VI. Alternatively, the interconnections between the various gear members, the input member 212, the output member 214 and the casing 280, 282, 284 obtained by selective engagement of the various torque-transmitting mechanisms 260, 262, 264, 266 and 268 as described above are possible with the torque-transmitting mechanisms 260, 262, 264, 266 and 268 disposed in other zones as shown in the chart of FIG. 3B. An "X" in the chart of FIG. 3B indicates that the particular torque-transmitting mechanism is positionable in the referenced zone and an "O" indicates that the particular torque-transmitting mechanisms are not to be located in the referenced zone. It should be appreciated that the selection of location for the torque-transmitting mechanism of each row in the chart of FIG. 3B is feasible independently of the other rows. Accordingly, torque-transmitting mechanism 260 is locatable in any of three possible zones; torque-transmitting mechanism 262 is locatable in any of three of the six possible zones; torque-transmitting mechanism 264 is locatable in any of two of the six possible zones; torque transmitting mechanism 266 is locatable in any of three of the six possible zones; and torque-transmitting mechanism 268 is locatable in any of four of the six possible zones.

The first interconnecting member 270 extends through the fourth zone IV and the sixth zone VI to interconnect ring gear member 224 for common rotation with sun gear member 232. The second interconnecting member 272 extends through the second zone II and the sixth zone VI to interconnect carrier member 246 for common rotation with ring gear member 234. A first hub 273 extends from torque-transmitting mechanism 264 to torque-transmitting mechanism 268. The first hub 273 extends through the first zone I and the sixth zone VI. A second hub 275 extends from the carrier member 236 to the first hub 273. The second hub 275 extends through the third zone III, the fourth zone IV, and the sixth zone VI. A portion 277 of the second hub 275 extends through an annular opening in the sun gear member 232 and runs coaxially and concentrically with the drive shaft 352

Referring to FIG. 4, the driveline 304 is referred to as a "wrap-around" driveline as it wraps around one end of the engine 302 and under the engine 302 in a transaxle arrangement aligned with the front wheels 306, 308. Specifically, the engine has an engine output member 310 for delivering driving torque. The engine output member 310 rotates about and defines an engine axis 312. The engine output member 310 extends through the engine case 314 into a portion of casing 316 that is either separate from or integrated with the transmission casing 280, 282, 284. A rotatable drive sprocket or gear 318 rotates concentrically about and commonly with the engine output member 310. A rotatable element 320, which in this embodiment is an endless transfer element, transfers engine torque from the drive sprocket 318 to a drive sprocket or gear 322 that rotates concentrically about and commonly with the transmission input member 212, shown in cross-sectional view to indicate that the transmission input member 212 is a tubular shaft surrounding a drive shaft 352 that is concentric with the transmission input member 212. Both the transmission input member 212 and the drive shaft 352, as well as the transmission output member 214, rotate about the transmission axis 269. Thus, the rotatable element 320 transfers torque from the engine 302 to the transmission 210, and allows the engine axis 312 and the transmission axis 269 to be arranged parallel with one another, both running laterally with respect to the vehicle 301, with the transmission axis 269, the transmission input member 212, and transmission output member 214 being aligned and coaxial with the front wheels 306, 308. The rotatable element 320 may be a chain or belt.

The gearing arrangement 216 is indicated only schematically in FIG. 4 as generally being in the area indicated by the dashed box, between the transmission input member 212 and the transmission output member 214, with the transmission input member 212 and transmission output member 214 connected for rotation with different members of the gearing arrangement 216 as shown and described with respect to FIG. 3A.

The driveline 304 further includes an additional planetary gear set 324, also referred to as a final drive planetary gear set, as well as a differential mechanism 326, each of which are arranged concentrically and coaxially with the transmission axis 269 and transfer torque from the transmission output member 214 to the wheels 306, 308 as described below. Although depicted as a bevel-type differential mechanism in FIG. 4, the differential mechanism 326 may alternatively be a compound planetary gear set.

The final drive planetary gear set 324 includes a sun gear member 332, a ring gear member 334 and a carrier member 336 that rotatably supports a plurality of pinion gears 337 that intermesh with both the sun gear member 332 and the ring gear member 334. The sun gear member 332 is connected for common rotation with the transmission output member 214. The ring gear member 334 is grounded to the transmission casing 280.

The differential mechanism 326 includes a carrier member 340 that rotates with and supports a pinion shaft 342 on which pinion gears 344 rotate commonly. The carrier member 340 is connected for common rotation with the carrier member 336 of the final drive planetary gear set 324 and is referred to herein as the first member of the differential gear set 326. The carrier member 340 also supports side gears 346 and 348, both of which mesh with the pinion gears 344. The side gear 346, referred to as the second member of the differential gear set 326, is connected for rotation with a drive shaft 350 which delivers driving torque to wheel 306 via wheel axle 351. The wheel axle 351 may be connected for common rotation with drive shaft 350 or may be integrally formed as a unitary component with the drive shaft 350. The side gear 348, referred to as the third member of the differential gear set 326, is connected for common rotation with a drive shaft 352 which delivers driving torque to wheel 308 via wheel axle 354. The wheel axle 354 may be connected for common rotation with drive shaft 352 or may be integrally formed as a unitary component with the drive shaft 352. Both of the drive shafts 350, 352 are concentric and coaxial with the transmission axis 269. The drive shaft 352 passes through a central opening in the sun gear member 332 of the final drive planetary gear set 324, the tubular transmission output member 214, the transmission gearing arrangement 216, the tubular transmission input member 212, and the rotatable element 320 and a central opening in the sprocket 322 before connecting for common rotation with wheel axle 354.

Accordingly, the driveline 304 is arranged to wrap around the engine 302, with the transmission 210 arranged on a transverse axis (transmission axis 269) parallel with an axis 312 of the engine 302, with the transmission input member 212 and the transmission output member 214 arranged at opposing ends of the transmission 210, coaxial with one another. The transmission 210 delivers torque to the front wheels 306, 308 at eight forward speed ratios and a reverse speed ratio by engaging five torque-transmitting mechanisms 260, 262, 264, 266 and 268 in various combinations. The torque-transmitting mechanisms 260, 262, 264, 266 and 268 may be located in a variety of different zones defined by the transmission 210, as described above. Thus, a compact front-wheel drive transmission 210 is conveniently packaged as part of a wrap-around driveline 304.

Figure 5:
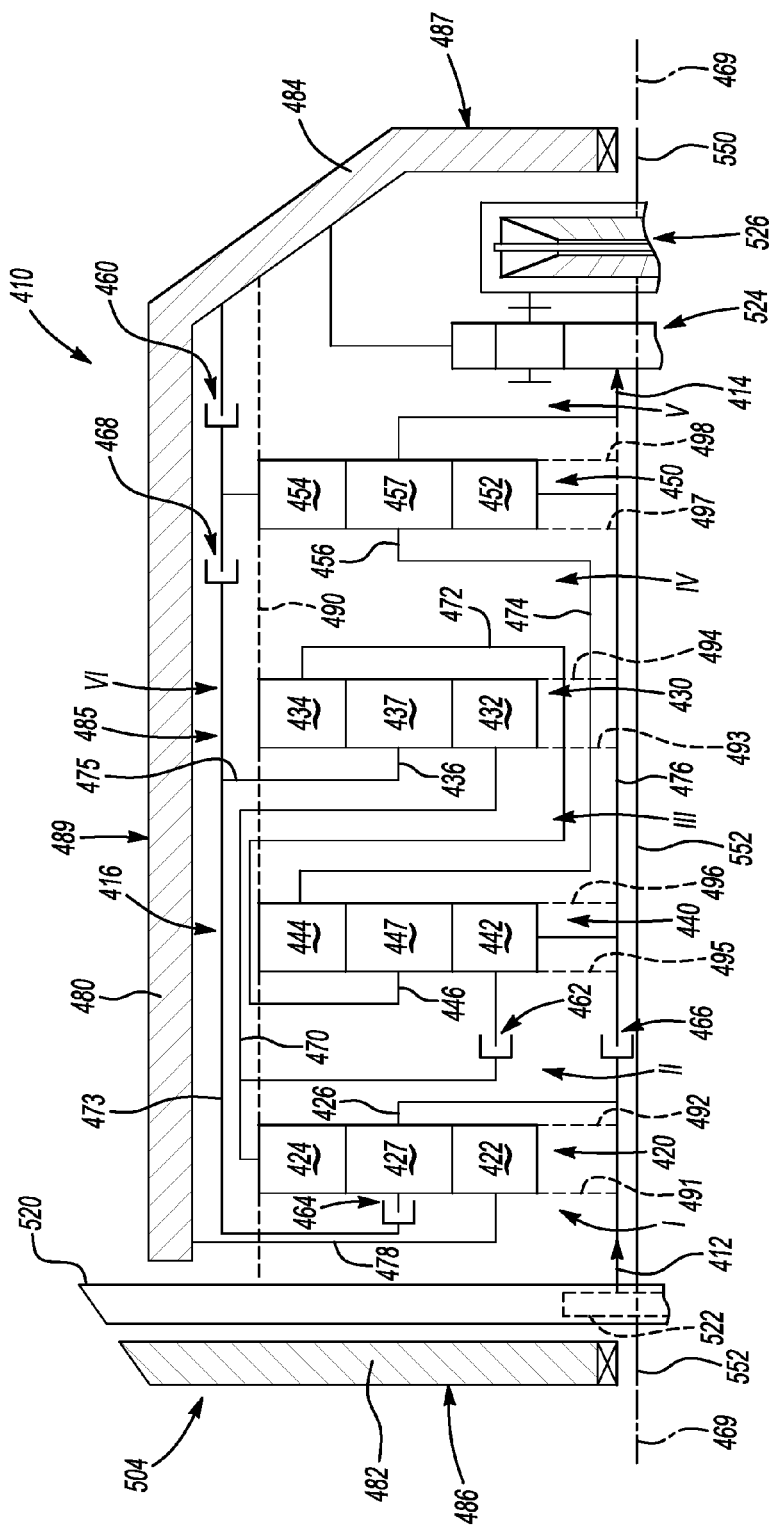
FIG. 5A is a schematic, cross-sectional, partially fragmentary illustration of a first embodiment of a multi-speed transmission within the scope of the invention showing different zones within the transmission.
FIG. 5B is a chart listing the selected zones in which various torque-transmitting mechanisms of the transmission of FIG. 5A may be located.

FIG. 5A shows a transmission 410 within the scope of the invention having a transmission input member 412 for receiving power from a power source such as an internal combustion engine and a transmission output member 414 for delivering power to a final drive mechanism such as the wheels of a vehicle. The transmission 410 includes a gearing arrangement 416 having four planetary gear sets 420, 430, 440 and 450 and five selectively engagable torque-transmitting mechanisms 460, 462, 464, 466 and 468. Only that portion of the transmission 410 above an axis of rotation 469 (referred to as a transmission axis) of the input and output members 412, 414 is shown. Those skilled in the art will recognize that the planetary gear sets 420, 430, 440 and 450 as well as torque-transmitting mechanisms 460, 462, 464, 466, and 468 are symmetrical about the axis of rotation 469.

Figure 6:
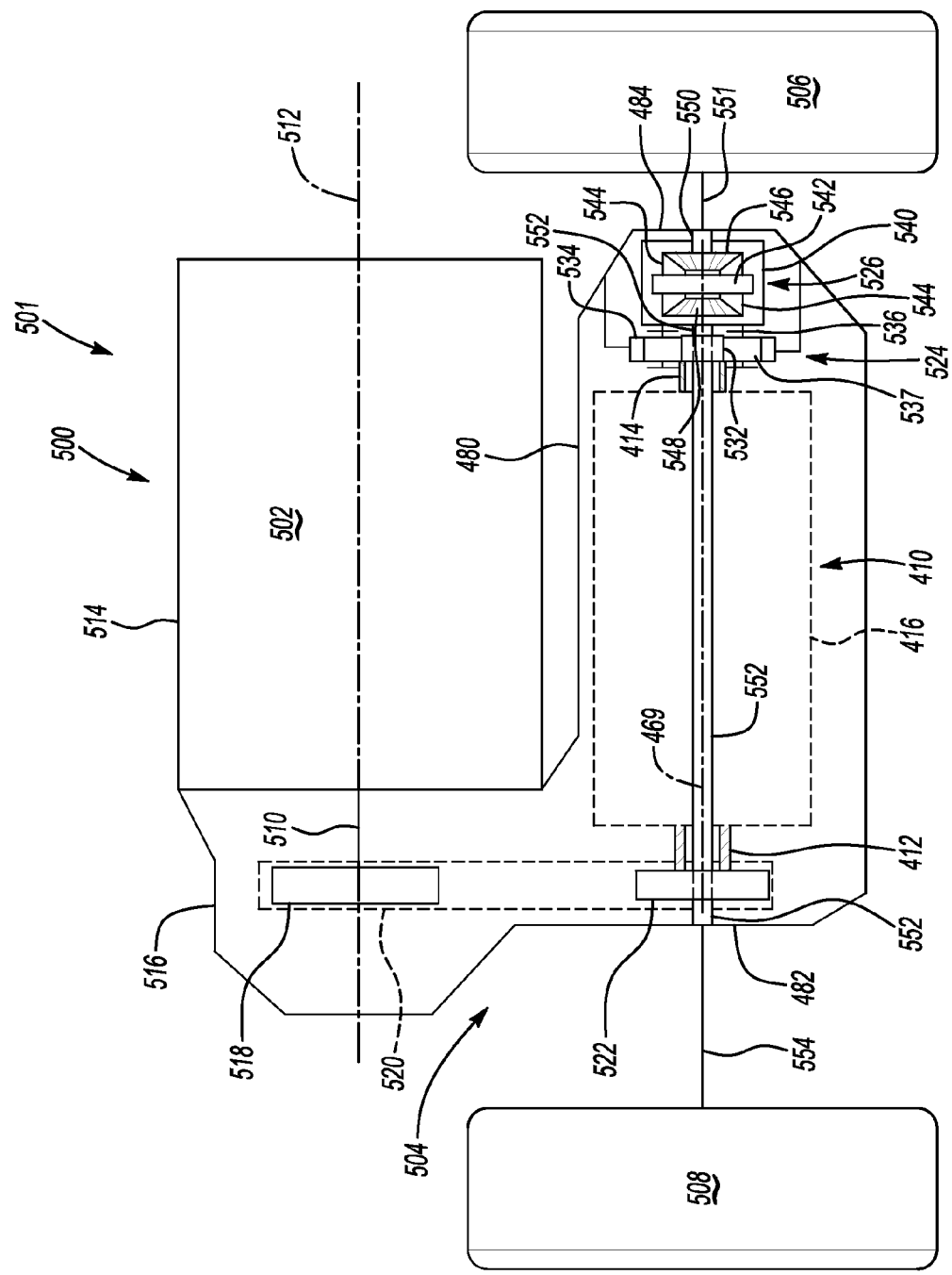
FIG. 6 is a schematic partially cross-sectional illustration of a powertrain including an engine connected with a driveline that includes the transmission of FIG. 5A to provide power to front vehicle wheels.

The transmission 410 is part of a powertrain 500 of a vehicle 501 illustrated in FIG. 6. The powertrain 500 includes an engine 502 and a driveline 504. The engine 502 transfers torque to the driveline 504 to deliver driving torque to first and second front wheels, 506, 508, respectively. The driveline 504 includes the transmission 410 and will be described in detail hereinafter with respect to FIG. 6.

Referring to FIG. 5A, each planetary gear set 420, 430, 440 and 450 includes concentric rotatable components. Specifically, planetary gear set 420 includes a sun gear member 422, a ring gear member 424 and a carrier member 426 that rotatably supports a plurality of pinion gears 427 that intermesh with both the sun gear member 422 and the ring gear member 424. Planetary gear set 430 includes a sun gear member 432, a ring gear member 434 and a carrier member 436 that rotatably supports a plurality of pinion gears 437 that intermesh with both the sun gear member 432 and the ring gear member 434. Planetary gear set 440 includes a sun gear member 442, a ring gear member 444 and a carrier member 446 that rotatably supports a plurality of pinion gears 447 that intermesh with both the sun gear member 442 and the ring gear member 444. Planetary gear set 450 includes a sun gear member 452, a ring gear member 454 and a carrier member 456 that rotatably supports a plurality of pinion gears 457 that intermesh with both the sun gear member 452 and the ring gear member 454.

In the embodiment of FIG. 5A, planetary gear set 420 is the first planetary gear set, planetary gear set 430 is the second planetary gear set, planetary gear set 440 is the third planetary gear set, and planetary gear set 450 is the fourth planetary gear set.

The transmission input member 412 is continuously connected for common rotation with carrier member 426. The transmission output member 414 is continuously connected for common rotation with carrier member 456. A first interconnecting member 470 continuously interconnects ring gear member 424 for common rotation with sun gear member 432. A second interconnecting member 472 continuously interconnects carrier member 446 for common rotation with ring gear member 434. A third interconnecting member 474 continuously interconnects ring gear member 444 for common rotation with carrier member 456. A fourth interconnecting member 476 continuously interconnects sun gear member 442 for common rotation with sun gear member 452. Each of the interconnecting members 470, 472, 474 and 476 may be one component or multiple components. The sun gear member 422 is continuously grounded to a housing 480 (also referred to herein as a housing portion) of the transmission 410 via a radially-extending structural member 478. The housing 480 circumferentially surrounds the gear sets 420, 430, 440 and 450 as well as the torque-transmitting mechanisms 460, 462, 464, 466 and 468. The transmission 410 further includes a first end wall 482 generally at one end of the transmission 410 and a second end wall 484 generally at an opposing end of the transmission 410. The housing 480 joins the first and second end walls 482, 484. It should be appreciated that the housing 480 and the first and second end walls 482, 484 form a transmission casing and may be integrated or separate components of the casing. The transmission casing will be referred to herein as 480, 482, 484. The transmission casing 480, 482, 484 defines a cavity 485. The end walls 482 and 484 enclose the cavity 485 axially, but are likely a conical or irregular shape rather than a planar shape as schematically depicted.

The planetary gear sets 420, 430, 440, and 450 and torque-transmitting mechanisms 460, 462, 464, 466 and 468 are located in the cavity 485. The transmission casing 480, 482, 484 and the planetary gear sets 420, 430, 440, and 450 cooperate to define six spaces or zones I-VI within the cavity 485. A first zone I is defined between an outer surface 486 of the first end wall 482 and a plane 491 running generally parallel with a side of the planetary gear set 420 adjacent the first end wall 482, and runs radially outward to a circumferential boundary 490 running along a radially-outermost surface of each of the ring gear members 424, 434, 444 and 454. A second zone II is defined between a plane 492 running generally parallel along a side of the planetary gear set 420 facing the planetary gear set 440, a plane 495 running generally parallel along a side of the planetary gear set 440 facing the planetary gear set 420 and the circumferential boundary 490. A third zone III is defined between a plane 496 running generally parallel along a side of the planetary gear set 440 facing the planetary gear set 430, a plane 493 running generally parallel along a side of the planetary gear set 430 facing the planetary gear set 440 and the circumferential boundary 490. A fourth zone IV is defined between a plane 494 running generally parallel along a side of the planetary gear set 430 facing planetary gear set 450, a plane 497 running generally parallel along a side of the planetary gear set 450 facing planetary gear set 440 and the circumferential boundary 490. A fifth zone V is defined between a plane 498 running generally parallel along a side of the planetary gear set 450 facing the second end wall 484, an outer surface 487 of the second end wall 484 and the circumferential boundary 490. A sixth zone IV is defined between the circumferential boundary 490, an outer surface 489 of the housing 480, and the outer surfaces 486 and 487 of the first and second end walls 482 and 484, respectively. The structural member 478 traverses zones I and VI.

Torque-transmitting mechanisms 462, 464, 466 and 468 are rotating-type clutches and torque-transmitting mechanism 460 is a brake, also referred to as a reaction clutch. Torque-transmitting mechanism 460 is selectively engagable to ground the ring gear member 454 to the transmission casing 480, 482, 484. The torque-transmitting mechanism 462 is selectively engagable to connect the ring gear member 424 and the sun gear member 432 for common rotation with the sun gear member 442. The torque-transmitting mechanism 464 is selectively engagable to connect the carrier member 426 for common rotation with the carrier member 436. The torque-transmitting mechanism 466 is selectively engagable to connect the input member 412 and the carrier member 426 for common rotation with the sun gear member 442 and the sun gear member 452. The torque-transmitting mechanism 468 is selectively engagable to connect the carrier member 436 for common rotation with the ring gear member 454.

The transmission 410 provides eight forward speed ratios and one reverse speed ratio between the transmission input member 412 and the transmission output member 414. Specifically, a reverse speed ratio is established by engaging torque-transmitting mechanisms 460 and 468; a first forward speed ratio is established by engaging torque-transmitting mechanisms 460 and 466; a second forward speed ratio is established by engaging torque-transmitting mechanisms 460 and 462; a third forward speed ratio is established by engaging torque-transmitting mechanisms 460 and 464; a fourth forward speed ratio is established by engaging torque-transmitting mechanisms 462 and 464; a fifth forward speed ratio is established by engaging torque-transmitting mechanisms 464 and 466; a sixth forward speed ratio is established by engaging torque-transmitting mechanisms 464 and 468; a seventh forward speed ratio is established by engaging torque-transmitting mechanisms 466 and 468; and an eighth forward speed ratio is established by engaging torque-transmitting mechanisms 462 and 468. Thus, single transition upshifts and downshifts are used between subsequent speed ratios.

As shown in FIG. 5A, torque-transmitting mechanism 464 is located in zone I; torque-transmitting mechanisms 462 and 466 are located in zone II; and torque-transmitting mechanisms 460 and 468 are located in zone VI. Alternatively, the interconnections between the various gear members, the input member 412, the output member 414 and the casing 480, 482, 484 obtained by selective engagement of the various torque-transmitting mechanisms 460, 462, 464, 466 and 468 as described above are possible with the torque-transmitting mechanisms 460, 462, 464, 466 and 468 disposed in other zones as shown in the chart of FIG. 5B. An "X" in the chart of FIG. 5B indicates that the particular torque-transmitting mechanism is positionable in the referenced zone and an "O" indicates that the particular torque-transmitting mechanisms are not to be located in the referenced zone. It should be appreciated that the selection of location for the torque-transmitting mechanism of each row in the chart of FIG. 5B is feasible independently of the other rows. Accordingly, torque-transmitting mechanism 460 is locatable in any of three possible zones; torque-transmitting mechanism 462 is locatable in any of three of the six possible zones; torque-transmitting mechanism 464 is locatable in any of two of the six possible zones; torque transmitting mechanism 466 is locatable in any of three of the six possible zones; and torque-transmitting mechanism 468 is locatable in any of four of the six possible zones.

The first interconnecting member 470 extends through the third zone III and the sixth zone VI to interconnect ring gear member 424 for common rotation with sun gear member 432. The second interconnecting member 472 extends through the second zone II, the third zone III, the fourth zone IV, and the sixth zone VI to interconnect carrier member 446 for common rotation with ring gear member 434. A portion of the interconnecting member 472 extends through an annular opening in the sun gear member 432 and runs coaxially and concentrically with the drive shaft 552. A first hub 473 extends from torque-transmitting mechanism 464 to torque-transmitting mechanism 468. The first hub 473 extends through the first zone I and the sixth zone VI. A second hub 475 extends from the carrier member 436 to the first hub 473. The second hub 475 extends through the third zone III, and the sixth zone VI.

Referring to FIG. 6, the driveline 504 is referred to as a "wrap-around" driveline as it wraps around one end of the engine 502 and under the engine 502 in a transaxle arrangement aligned with the front wheels 506, 508. Specifically, the engine has an engine output member 510 for delivering driving torque. The engine output member 510 rotates about and defines an engine axis 512. The engine output member 510 extends through the engine case 514 into a portion of casing 516 that is either separate from or integrated with the transmission casing 480, 482, 484. A rotatable drive sprocket or gear 518 rotates concentrically about and commonly with the engine output member 510. A rotatable element 520, which in this embodiment is an endless transfer element, transfers engine torque from the drive sprocket 518 to a drive sprocket or gear 522 that rotates concentrically about and commonly with the transmission input member 412, shown in cross-sectional view to indicate that the transmission input member 412 is a tubular shaft surrounding a drive shaft 552 that is concentric with the transmission input member 412. Both the transmission input member 412 and the drive shaft 552, as well as the transmission output member 414, rotate about the transmission axis 469. Thus, the rotatable element 520 transfers torque from the engine 502 to the transmission 410, and allows the engine axis 512 and the transmission axis 469 to be arranged parallel with one another, both running laterally with respect to the vehicle 501, with the transmission axis 469, the transmission input member 412, and transmission output member 414 being aligned and coaxial with the front wheels 506, 508. The rotatable element 520 may be a chain or belt.

The gearing arrangement 416 is indicated only schematically in FIG. 6 as generally being in the area indicated by the dashed box, between the transmission input member 412 and the transmission output member 414, with the transmission input member 412 and transmission output member 414 connected for rotation with different members of the gearing arrangement 416 as shown and described with respect to FIG. 5A.

The driveline 504 further includes an additional planetary gear set 524, also referred to as a final drive planetary gear set, as well as a differential mechanism 526, each of which are arranged concentrically and coaxially with the transmission axis 469 and transfer torque from the transmission output member 414 to the wheels 506, 508 as described below. Although depicted as a bevel-type differential mechanism in FIG. 6, the differential mechanism 526 may alternatively be a compound planetary gear set.

The final drive planetary gear set 524 includes a sun gear member 532, a ring gear member 534 and a carrier member 536 that rotatably supports a plurality of pinion gears 537 that intermesh with both the sun gear member 532 and the ring gear member 534. The sun gear member 532 is connected for common rotation with the transmission output member 414. The ring gear member 534 is grounded to the transmission casing 480.

The differential mechanism 526 includes a carrier member 540 that rotates with and supports a pinion shaft 542 on which pinion gears 544 rotate commonly. The carrier member 540 is connected for common rotation with the carrier member 536 of the final drive planetary gear set 524 and is referred to herein as the first member of the differential gear set 526. The carrier member 540 also supports side gears 546 and 548, both of which mesh with the pinion gears 544. The side gear 546, referred to as the second member of the differential gear set 526, is connected for rotation with a drive shaft 550 which delivers driving torque to wheel 506 via wheel axle 551. The wheel axle 551 may be connected for common rotation with drive shaft 550 or may be integrally formed as a unitary component with the drive shaft 550. The side gear 548, referred to as the third member of the differential gear set 526, is connected for common rotation with a drive shaft 552 which delivers driving torque to wheel 508 via wheel axle 554. The wheel axle 554 may be connected for common rotation with drive shaft 552 or may be integrally formed as a unitary component with the drive shaft 552. Both of the drive shafts 550, 552 are concentric and coaxial with the transmission axis 469. The drive shaft 552 passes through a central opening in the sun gear member 532 of the final drive planetary gear set 524, the tubular transmission output member 414, the transmission gearing arrangement 416, the tubular transmission input member 412, and the rotatable element 520 and a central opening in the sprocket 522 before connecting for common rotation with wheel axle 554.

Accordingly, the driveline 504 is arranged to wrap around the engine 502, with the transmission 410 arranged on a transverse axis (transmission axis 469) parallel with an axis 512 of the engine 502, with the transmission input member 412 and the transmission output member 414 arranged at opposing ends of the transmission 410, coaxial with one another. The transmission 410 delivers torque to the front wheels 506, 508 at eight forward speed ratios and a reverse speed ratio by engaging five torque-transmitting mechanisms 460, 462, 464, 466 and 468 in various combinations. The torque-transmitting mechanisms 460, 462, 464, 466 and 468 may be located in a variety of different zones defined by the transmission 410, as described above. Thus, a compact front-wheel drive transmission 410 is conveniently packaged as part of a wrap-around driveline 504.

Figures 7A, 7B:
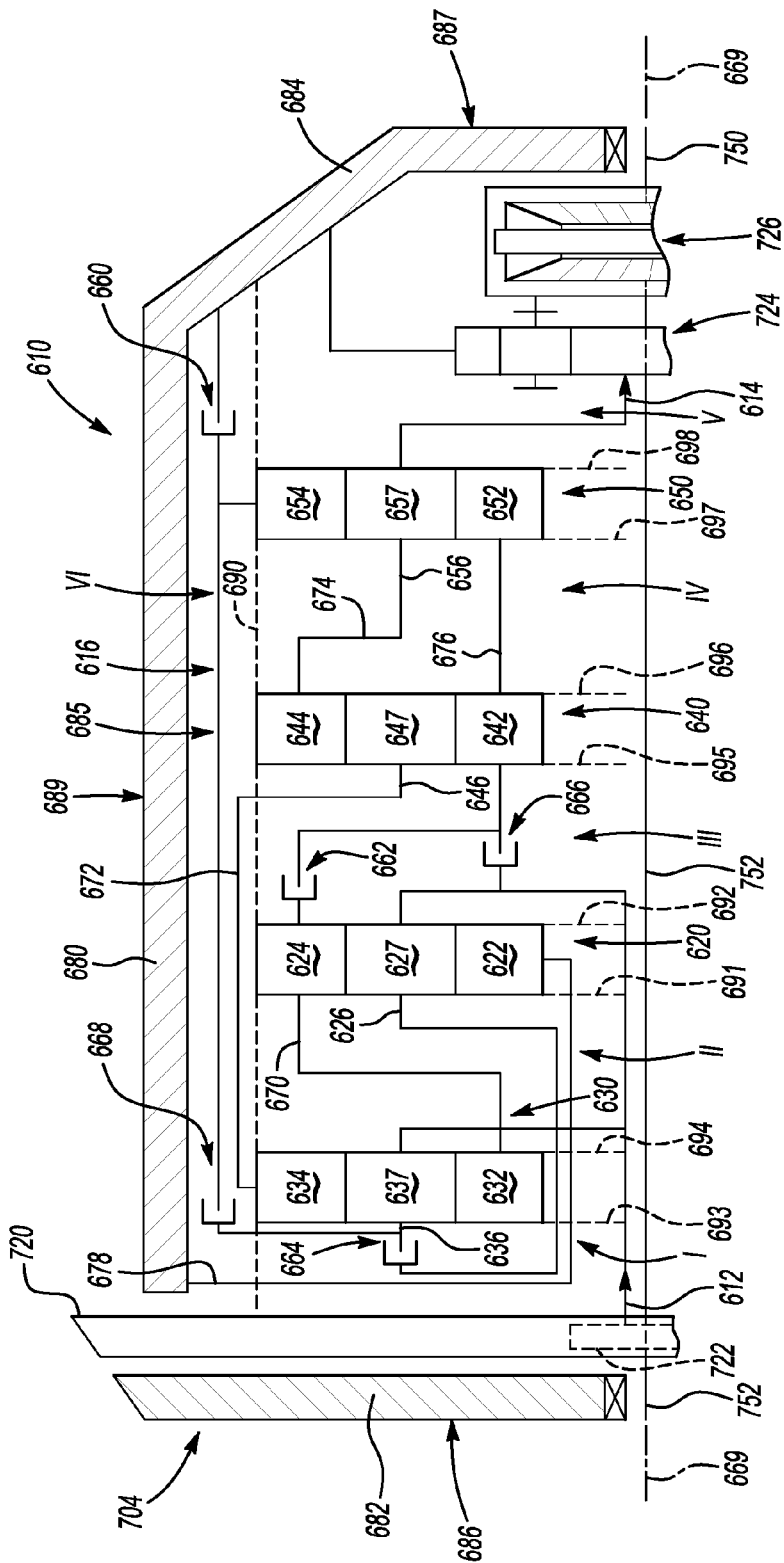
FIG. 7A is a schematic, cross-sectional, partially fragmentary illustration of a first embodiment of a multi-speed transmission within the scope of the invention showing different zones within the transmission.
FIG. 7B is a chart listing the selected zones in which various torque-transmitting mechanisms of the transmission of FIG. 7A may be located.

FIG. 7A shows a transmission 610 has an input member 612 for receiving power from a power source such as an internal combustion engine and transmission output member 614 for delivering power to a final drive mechanism such as the wheels of a vehicle. The transmission 610 includes a gearing arrangement 616 having four planetary gear sets 620, 630, 640 and 650, and five selectively engagable torque-transmitting mechanisms 660, 662, 664, 666 and 668. Only that portion of the transmission 610 above an axis of rotation 669 (referred to as a transmission axis) of the input and output members 612, 614 is shown. Those skilled in the art will recognize that the planetary gear sets 620, 630, 640 and 650 as well as torque-transmitting mechanisms 660, 662, 664, 666, and 668 are symmetrical about the axis of rotation 669.

Figure 8:
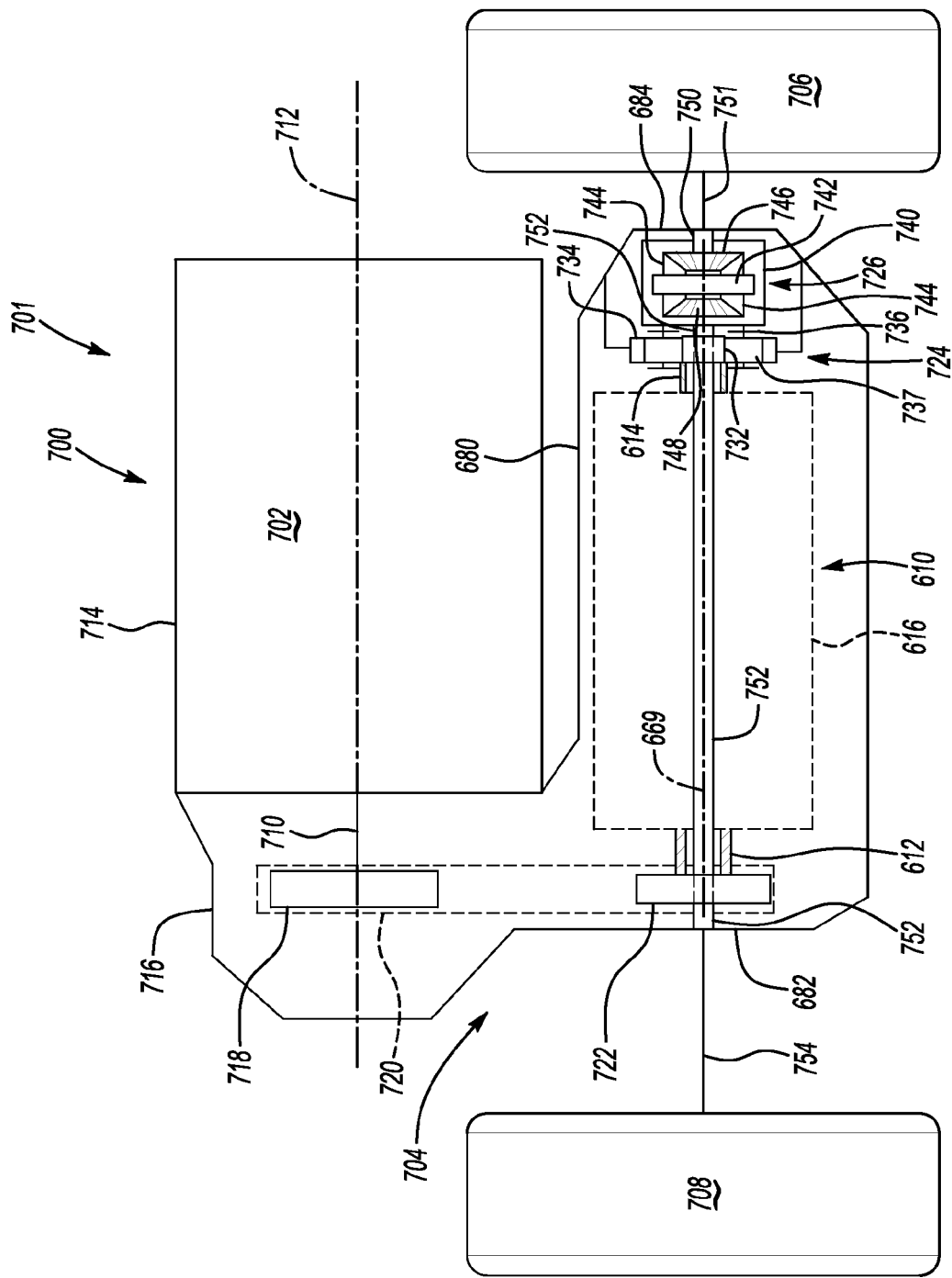
FIG. 8 is a schematic partially cross-sectional illustration of a powertrain including an engine connected with a driveline that includes the transmission of FIG. 7A to provide power to front vehicle wheels.

The transmission 610 is part of a powertrain 700 of a vehicle 701 illustrated in FIG. 8. The powertrain 700 includes an engine 702 and a driveline 704. The engine 702 transfers torque to the driveline 704 to deliver driving torque to first and second front wheels, 706, 708, respectively. The driveline 704 includes the transmission 610 and will be described in detail hereinafter with respect to FIG. 8.

Referring to FIG. 7A, planetary gear set 620 is the first planetary gear set, planetary gear set 630 is the second planetary gear set, planetary gear set 640 is the third planetary gear set, and planetary gear set 650 is the fourth planetary gear set.

Each planetary gear set 620, 630, 640 and 650 includes concentric rotatable components. Specifically, planetary gear set 620 includes a sun gear member 622, a ring gear member 624 and a carrier member 626 that rotatably supports a plurality of pinion gears 627 that intermesh with both the sun gear member 622 and the ring gear member 624. Planetary gear set 630 includes a sun gear member 632, a ring gear member 634 and a carrier member 636 that rotatably supports a plurality of pinion gears 637 that intermesh with both the sun gear member 632 and the ring gear member 634. Planetary gear set 640 includes a sun gear member 642, a ring gear member 644 and a carrier member 646 that rotatably supports a plurality of pinion gears 647 that intermesh with both the sun gear member 642 and the ring gear member 644. Planetary gear set 650 includes a sun gear member 652, a ring gear member 654 and a carrier member 656 that rotatably supports a plurality of pinion gears 657 that intermesh with both the sun gear member 652 and the ring gear member 654.

The transmission input member 612 is continuously connected for common rotation with carrier member 626. The transmission output member 614 is continuously connected for common rotation with carrier member 656. An interconnecting member 670 continuously connects sun gear member 632 for common rotation with ring gear member 624. An interconnecting member 672 continuously connects ring gear member 634 for common rotation with carrier member 646. An interconnecting member 674 continuously connects ring gear member 644 for common rotation with carrier member 656. An interconnecting member 676 continuously connects sun gear member 642 for common rotation with sun gear member 652. The interconnecting members 670, 672, 674, and 676 may each be one component or multiple components. The sun gear member 622 is continuously grounded to a housing 680 of the transmission 610 via a radially-extending structural member 678. The housing 680 circumferentially surrounds the gear sets 620, 630, 640 and 650 as well as the torque-transmitting mechanisms 660, 662, 664, 666, and 668. The transmission 610 further includes a first end wall 682 generally at one end of the transmission 610 and a second end wall 684 generally at an opposing end of the transmission 610. The housing 680 joins the first and second end walls 682, 684. It should be appreciated that the housing 680 and the first and second end walls 682, 684 form a transmission casing and may be integrated or separate components of the casing. The transmission casing will be referred to herein as 680, 682, 684. The transmission casing 680, 682, 684 defines a cavity 685. The end walls 682 and 684 enclose the cavity 685 axially, but are likely a conical or irregular shape rather than a planar shape as schematically depicted.

The planetary gear sets 620, 630, 640, and 650 and torque-transmitting mechanisms 660, 662, 664, 666 and 668 are located in the cavity 685. The transmission casing 680, 682, 684 and the planetary gear sets 620, 630, 640, and 650 cooperate to define six spaces or zones I-VI within the cavity 685. A first zone I is defined between an outer surface 686 of the first end wall 682 and a plane 693 running generally parallel with a side of the planetary gear set 630 adjacent the first end wall 682, and runs radially outward to a circumferential boundary 690 running along a radially-outermost surface of each of the ring gear members 624, 634, 644 and 654. A second zone II is defined between a plane 694 running generally parallel along a side of the planetary gear set 630 facing the planetary gear set 620, a plane 691 running generally parallel along a side of the planetary gear set 620 facing the planetary gear set 630 and the circumferential boundary 690. A third zone III is defined between a plane 692 running generally parallel along a side of the planetary gear set 620 facing the planetary gear set 640, a plane 695 running generally parallel along a side of the planetary gear set 640 facing the planetary gear set 620 and the circumferential boundary 690. A fourth zone IV is defined between a plane 696 running generally parallel along a side of the planetary gear set 640 facing the planetary gear set 650, a plane 697 running generally parallel along a side of planetary gear set 650 facing planetary gear set 640, and the circumferential boundary 690. A fifth zone V is defined between a plane 698 running generally parallel along a side of the planetary gear set 650 facing the second end wall 684, an outer surface 687 of the second end wall 684 and the circumferential boundary 690. A sixth zone VI is defined between the circumferential boundary 690, an outer surface 689 of the housing 680, and the outer surfaces 686 and 687 of the first and second end walls 682 and 684, respectively. The structural member 678 traverses zones I, II and VI.

Torque-transmitting mechanisms 662, 664, 666, and 668 are rotating-type clutches and torque-transmitting mechanism 660 is a brake, also referred to as a reaction clutch. The torque-transmitting mechanism 660 is selectively engagable to ground the ring gear member 654 to the transmission casing 680, 682, 684. Torque-transmitting mechanism 662 is selectively engagable to connect the ring gear member 624 for common rotation with the sun gear member 642. The torque-transmitting mechanism 664 is selectively engagable to connect the carrier member 626 for common rotation with the carrier member 636. The torque-transmitting mechanism 666 is selectively engagable to connect the transmission input member 612 and the carrier member 626 for common rotation with the sun gear member 642. The torque-transmitting mechanism 668 is selectively engagable to connect the carrier member 636 for common rotation with the ring gear member 654.

The transmission 610 provides eight forward speed ratios and one reverse speed ratio between the transmission input member 612 and the transmission output member 614. Specifically, a reverse speed ratio is established by engaging torque-transmitting mechanisms 660 and 668; a first forward speed ratio is established by engaging torque-transmitting mechanisms 660 and 666; a second forward speed ratio is established by engaging torque-transmitting mechanisms 660 and 662; a third forward speed ratio is established by engaging torque-transmitting mechanisms 660 and 664; a fourth forward speed ratio is established by engaging torque-transmitting mechanisms 662 and 664; a fifth forward speed ratio is established by engaging torque-transmitting mechanisms 664 and 666; a sixth forward speed ratio is established by engaging torque-transmitting mechanisms 664 and 668; a seventh forward speed ratio is established by engaging torque-transmitting mechanisms 666 and 668; and an eighth forward speed ratio is established by engaging torque-transmitting mechanisms 662 and 668. Thus, single transition upshifts and downshifts are used between subsequent speed ratios.

As shown in FIG. 7A, torque-transmitting mechanism 664 is located in zone I; torque-transmitting mechanisms 662 and 666 are located in zone III; and torque-transmitting mechanisms 660 and 668 are located in zone VI. Alternatively, the interconnections between the various gear members, the transmission input member 612, the transmission output member 614 and the transmission casing 680, 682, 684 obtained by selective engagement of the various torque-transmitting mechanisms 660, 662, 664, 666 and 668 as described above are possible with the torque-transmitting mechanisms 660, 662, 664, 666 and 668 disposed in other zones as shown in the chart of FIG. 7B. An "X" in the chart of FIG. 7B indicates that the particular torque-transmitting mechanism is positionable in the referenced zone and an "O" indicates that the particular torque-transmitting mechanisms are not to be located in the referenced zone. It should be appreciated that the selection of location for the torque-transmitting mechanism of each row in the chart of FIG. 7B is feasible independently of the other rows. Accordingly, torque-transmitting mechanism 660 is locatable in any of four of the six possible zones; torque-transmitting mechanism 662 is locatable in any of three of the six possible zones; torque-transmitting mechanism 664 is locatable in any of three of the six possible zones; torque transmitting mechanism 666 is locatable in any of three of the six possible zones; and torque-transmitting mechanism 668 is locatable in any of four of the six possible zones.

Referring to FIG. 8, the driveline 704 is referred to as a "wrap-around" driveline as it wraps around one end of the engine 702 and under the engine 702 in a transaxle arrangement aligned with the front wheels 706, 708. Specifically, the engine has an engine output member 710 for delivering driving torque. The engine output member 710 rotates about and defines an engine axis 712. The engine output member 710 extends through the engine case 714 into a portion of casing 716 that is either separate from or integrated with the transmission casing 680, 682, 684. A rotatable drive sprocket or gear 718 rotates concentrically about and commonly with the engine output member 710. A rotatable element 720, which in this embodiment is an endless transfer element, transfers engine torque from the drive sprocket 718 to a drive sprocket or gear 722 that rotates concentrically about and commonly with the transmission input member 612, shown in cross-sectional view to indicate that the transmission input member 612 is a tubular shaft surrounding a drive shaft 752 that is concentric with the transmission input member 612. Both the transmission input member 612 and the drive shaft 752, as well as the transmission output member 614, rotate about the transmission axis 669. Thus, the rotatable element 720 transfers torque from the engine 702 to the transmission 610, and allows the engine axis 712 and the transmission axis 669 to be arranged parallel with one another, both running laterally with respect to the vehicle 701, with the transmission axis 669, the transmission input member 612, and transmission output member 614 being aligned and coaxial with the front wheels 706, 708. The rotatable element 720 may be a chain or belt.

The gearing arrangement 616 is indicated only schematically in FIG. 8 as generally being in the area indicated by the dashed box, between the transmission input member 612 and the transmission output member 614, with the transmission input member 612 and transmission output member 614 connected for rotation with different members of the gearing arrangement 616 as shown and described with respect to FIG. 7A.

The driveline 704 further includes an additional planetary gear set 724, also referred to as a final drive planetary gear set, as well as a differential mechanism 726, each of which are arranged concentrically and coaxially with the transmission axis 669 and transfer torque from the transmission output member 614 to the wheels 706, 708 as described below. Although depicted as a bevel-type differential mechanism in FIG. 8, the differential mechanism 726 may alternatively be a compound planetary gear set.

The final drive planetary gear set 724 includes a sun gear member 732, a ring gear member 734 and a carrier member 736 that rotatably supports a plurality of pinion gears 737 that intermesh with both the sun gear member 732 and the ring gear member 734. The sun gear member 732 is connected for common rotation with the transmission output member 614. The ring gear member 734 is grounded to the transmission casing 680.

The differential mechanism 726 includes a carrier member 740 that rotates with and supports a pinion shaft 742 on which pinion gears 744 rotate commonly. The carrier member 740 is connected for common rotation with the carrier member 736 of the final drive planetary gear set 724 and is referred to herein as the first member of the differential gear set 726. The carrier member 740 also supports side gears 746 and 748, both of which mesh with the pinion gears 744. The side gear 746, referred to as the second member of the differential gear set 726, is connected for rotation with a drive shaft 750 which delivers driving torque to wheel 706 via wheel axle 751. The wheel axle 751 may be connected for common rotation with drive shaft 750 or may be integrally formed as a unitary component with the drive shaft 750. The side gear 748, referred to as the third member of the differential gear set 726, is connected for common rotation with a drive shaft 752 which delivers driving torque to wheel 708 via wheel axle 754. The wheel axle 754 may be connected for common rotation with drive shaft 752 or may be integrally formed as a unitary component with the drive shaft 752. Both of the drive shafts 750, 752 are concentric and coaxial with the transmission axis 669. The drive shaft 752 passes through a central opening in the sun gear member 732 of the final drive planetary gear set 724, the tubular transmission output member 614, the transmission gearing arrangement 616, the tubular transmission input member 612, and the rotatable element 720 and a central opening in the sprocket 722 before connecting for common rotation with wheel axle 754.

Accordingly, the driveline 704 is arranged to wrap around the engine 702, with the transmission 610 arranged on a transverse axis (transmission axis 669) parallel with an axis 712 of the engine 702, with the transmission input member 612 and the transmission output member 614 arranged at opposing ends of the transmission 610, coaxial with one another. The transmission 610 delivers torque to the front wheels 706, 708 at eight forward speed ratios and a reverse speed ratio by engaging five torque-transmitting mechanisms 660, 662, 664, 666 and 668 in various combinations. The torque-transmitting mechanisms 660, 662, 664, 666 and 668 may be located in a variety of different zones defined by the transmission 610, as described above. Thus, a compact front-wheel drive transmission 610 is conveniently packaged as part of a wrap-around driveline 704.

Figures 9A, 9B:
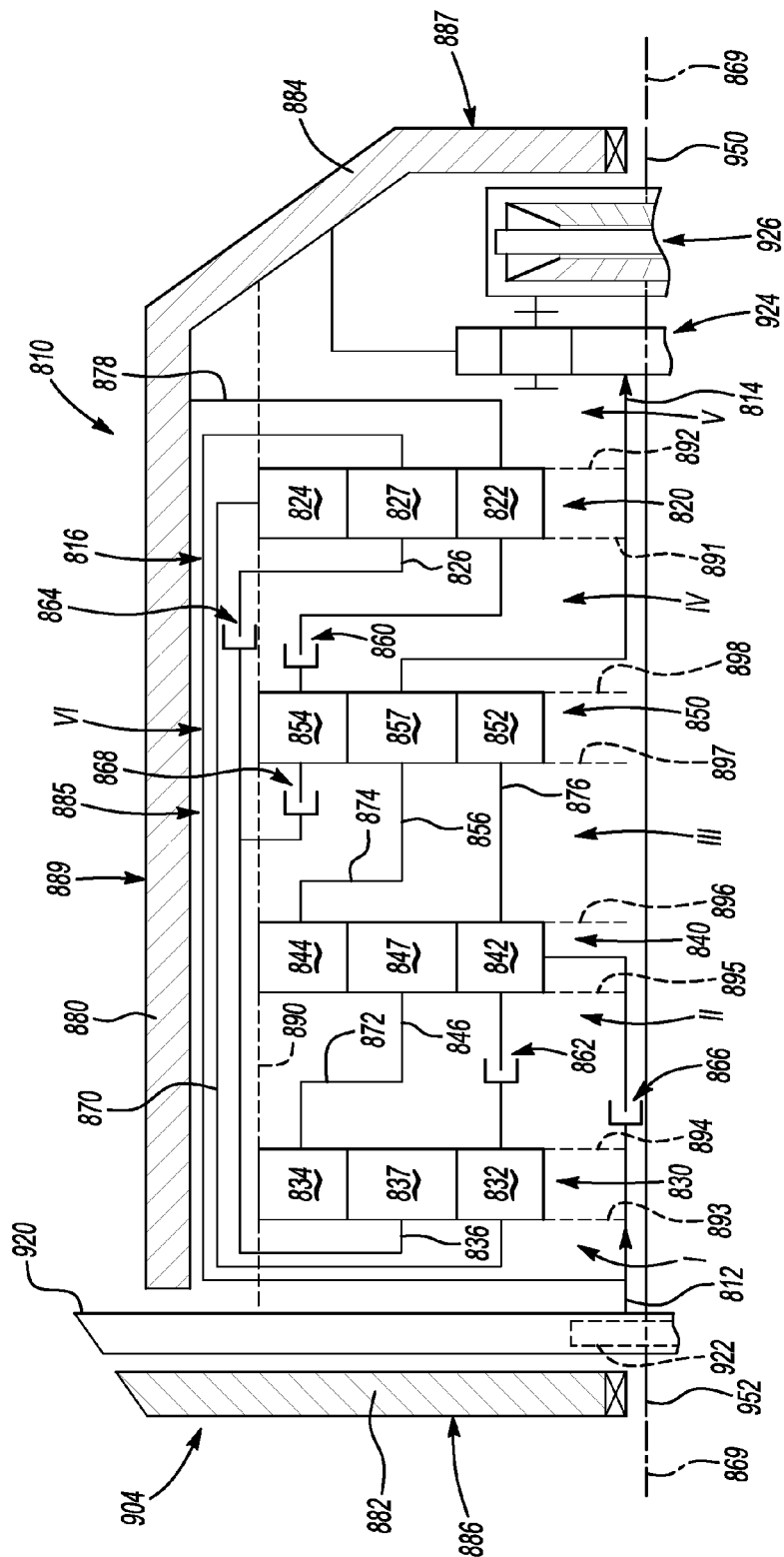
FIG. 9A is a schematic, cross-sectional, partially fragmentary illustration of a first embodiment of a multi-speed transmission within the scope of the invention showing different zones within the transmission.
FIG. 9B is a chart listing the selected zones in which various torque-transmitting mechanisms of the transmission of FIG. 9A may be located.

Referring to the drawings, wherein like reference numbers refer to like components, FIG. 9A shows a transmission 810 having a transmission input member 812 for receiving power from a power source such as an internal combustion engine and output member 814 for delivering power to a final drive mechanism such as the wheels of a vehicle. The transmission 810 includes a gearing arrangement 816 having four planetary gear sets 820, 830, 840 and 850 and five selectively engagable torque-transmitting mechanisms 860, 862, 864, 866, and 868. Only that portion of the transmission 810 above an axis of rotation 869 (referred to as the transmission axis) of the input and output members 812, 814 is shown. Those skilled in the art will recognize that the planetary gear sets 820, 830, 840 and 850 as well as torque-transmitting mechanisms 860, 862, 864, 866, and 868 are symmetrical about the axis of rotation 869.

The transmission 810 is part of a powertrain 900 of a vehicle 901 illustrated in FIG. 10. The powertrain 900 includes an engine 902 and a driveline 904. The engine 902 transfers torque to the driveline 904 to deliver driving torque to first and second front wheels, 906, 908, respectively. The driveline 904 includes the transmission 810 and will be described in detail hereinafter with respect to FIG. 10.

Referring to FIG. 9A, each planetary gear set 820, 830, 840 and 850 includes concentric rotatable components. Specifically, planetary gear set 820 includes a sun gear member 822, a ring gear member 824 and a carrier member 826 that rotatably supports a plurality of pinion gears 827 that intermesh with both the sun gear member 822 and the ring gear member 824. Planetary gear set 830 includes a sun gear member 832, a ring gear member 834 and a carrier member 836 that rotatably supports a plurality of pinion gears 837 that intermesh with both the sun gear member 832 and the ring gear member 834. Planetary gear set 840 includes a sun gear member 842, a ring gear member 844 and a carrier member 846 that rotatably supports a plurality of pinion gears 847 that intermesh with both the sun gear member 842 and the ring gear member 844. Planetary gear set 850 includes a sun gear member 852, a ring gear member 854 and a carrier member 856 that rotatably supports a plurality of pinion gears 857 that intermesh with both the sun gear member 852 and the ring gear member 854.

In the embodiment of FIG. 9A, planetary gear set 820 is the first planetary gear set, planetary gear set 830 is the second planetary gear set, planetary gear set 840 is the third planetary gear set, and planetary gear set 850 is the fourth planetary gear set.

The transmission input member 812 is continuously connected for common rotation with carrier member 826. The transmission output member 814 is continuously connected for common rotation with carrier member 856. An interconnecting member 870 continuously interconnects sun gear member 832 for common rotation with ring gear member 824. An interconnecting member 872 continuously interconnects ring gear member 834 for common rotation with carrier member 846. An interconnecting member 874 continuously interconnects ring gear member 844 for common rotation with carrier member 856. An interconnecting member 876 continuously interconnects sun gear member 842 for common rotation with sun gear member 852. Each of the interconnecting members 870, 872, 874 and 876 may be one component or multiple components. The sun gear member 822 is continuously grounded to a housing 880 of the transmission 810 via a radially-extending structural member 878. The housing 880 circumferentially surrounds the gear sets 820, 830, 840 and 850 as well as the torque-transmitting mechanisms 860, 862, 864, 866 and 868. The transmission 810 further includes a first end wall 882 generally at one end of the transmission 810 and a second end wall 884 generally at an opposing end of the transmission 810. The housing 880 joins the first and second end walls 882, 884. It should be appreciated that the housing 880 and the first and second end walls 882, 884 form a transmission casing and may be integrated or separate components of the casing. The transmission casing will be referred to herein as 880, 882, 884. The transmission casing 880, 882, 884 defines a cavity 885. The end walls 882 and 884 enclose the cavity 885 axially, but are likely a conical or irregular shape rather than a planar shape as schematically depicted.

The torque-transmitting mechanisms 860, 862, 864, 866 and 868 are located in the cavity 885. The transmission casing 880, 882, 884 and the planetary gear sets 820, 830, 840, and 850 cooperate to define six spaces or zones I-VI within the cavity 885. A first zone I is defined between an outer surface 886 of the first end wall 882 and a plane 893 running generally parallel with a side of the planetary gear set 830 adjacent the first end wall 882, and runs radially outward to a circumferential boundary 890 running along a radially-outermost surface of each of the ring gear members 824, 834, 844 and 854. A second zone II is defined between a plane 894 running generally parallel along a side of the planetary gear set 830 facing the planetary gear set 840, a plane 895 running generally parallel along a side of the planetary gear set 840 facing the planetary gear set 830, and the circumferential boundary 890. A third zone III is defined between a plane 896 running generally parallel along a side of the planetary gear set 840 facing the planetary gear set 850, a plane 897 running generally parallel along a side of the planetary gear set 850 facing the planetary gear set 840, and the circumferential boundary 890. A fourth zone IV is defined between a plane 898 running generally parallel along a side of the planetary gear set 850 facing the planetary gear set 820, a plane 891 running generally parallel along a side of planetary gear set 820 facing planetary gear set 850 and the circumferential boundary 890. A fifth zone V is defined between a plane 892 running generally parallel along a side of the planetary gear set 820 facing the second end wall 884, an outer surface 887 of the second end wall 884 and the circumferential boundary 890. A sixth zone VI is defined between the circumferential boundary 890, an outer surface 889 of the housing 880, and the outer surfaces 886 and 887 of the first and second end walls 882 and 884, respectively. The structural member 878 traverses zones V and VI.

Torque-transmitting mechanisms 860, 862, 864, 866 and 868 are rotating-type clutches and torque-transmitting mechanism 860 is a brake, also referred to as a reaction clutch. Torque-transmitting mechanism 860 is selectively engagable to connect the ring gear member 854 for common rotation with the sun gear member 822. The torque-transmitting mechanism 862 is selectively engagable to connect the sun gear member 832 for common rotation with the sun gear member 842. The torque-transmitting mechanism 864 is selectively engagable to connect the carrier member 836 for common rotation with the carrier member 826. The torque-transmitting mechanism 866 is selectively engagable to connect the transmission input member 812 and the carrier member 826 for common rotation with the sun gear member 842. The torque-transmitting mechanism 868 is selectively engagable to connect the carrier member 836 for common rotation with the ring gear member 854.

The transmission 810 provides eight forward speed ratios and one reverse speed ratio between the input member 812 and the output member 814. Specifically, a reverse speed ratio is established by engaging torque-transmitting mechanisms 860 and 868; a first forward speed ratio is established by engaging torque-transmitting mechanisms 860 and 866; a second forward speed ratio is established by engaging torque-transmitting mechanisms 860 and 862; a third forward speed ratio is established by engaging torque-transmitting mechanisms 860 and 864; a fourth forward speed ratio is established by engaging torque-transmitting mechanisms 862 and 864; a fifth forward speed ratio is established by engaging torque-transmitting mechanisms 864 and 866; a sixth forward speed ratio is established by engaging torque-transmitting mechanisms 864 and 868; a seventh forward speed ratio is established by engaging torque-transmitting mechanisms 866 and 868; and an eighth forward speed ratio is established by engaging torque-transmitting mechanisms 862 and 868. Thus, single transition upshifts and downshifts are used between subsequent speed ratios.

As shown in FIG. 9A, torque-transmitting mechanisms 862 and 866 are located in zone II; torque-transmitting mechanism 868 is disposed in zone III; torque-transmitting mechanism 860 is located in zone IV; and torque-transmitting mechanism 864 is disposed in zone VI. Alternatively, the interconnections between the various gear members, the transmission input member 812, the transmission output member 814 and the transmission casing 880, 882, 884 obtained by selective engagement of the various torque-transmitting mechanisms 860, 862, 864, 866, and 868 as described above are possible with the torque-transmitting mechanisms 860, 862, 864, 866, and 868 disposed in other zones as shown in the chart of FIG. 9B. An "X" in the chart of FIG. 9B indicates that the particular torque-transmitting mechanism is positionable in the referenced zone and an "O" indicates that the particular torque-transmitting mechanisms are not to be located in the referenced zone. It should be appreciated that the selection of location for the torque-transmitting mechanism of each row in the chart of FIG. 9B is feasible independently of the other rows. Accordingly, torque-transmitting mechanism 860 is locatable in any of two of the six possible zones; torque-transmitting mechanism 862 is locatable in any of two of the six possible zones; torque-transmitting mechanism 864 is locatable in any of three of the six possible zones; torque transmitting mechanism 866 is locatable in any of three of the six possible zones; and torque-transmitting mechanism 868 is locatable in any of four of the six possible zones.

Referring to FIG. 10, the driveline 904 is referred to as a "wrap-around" driveline as it wraps around one end of the engine 902 and under the engine 902 in a transaxle arrangement aligned with the front wheels 906, 908. Specifically, the engine has an engine output member 910 for delivering driving torque. The engine output member 910 rotates about and defines an engine axis 912. The engine output member 910 extends through the engine case 914 into a portion of casing 916 that is either separate from or integrated with the transmission casing 880, 882, 884. A rotatable drive sprocket or gear 918 rotates concentrically about and commonly with the engine output member 910. A rotatable element 920, which in this embodiment is an endless transfer element, transfers engine torque from the drive sprocket 918 to a drive sprocket or gear 922 that rotates concentrically about and commonly with the transmission input member 812, shown in cross-sectional view to indicate that the transmission input member 812 is a tubular shaft surrounding a drive shaft 952 that is concentric with the transmission input member 812. Both the transmission input member 812 and the drive shaft 952, as well as the transmission output member 814, rotate about the transmission axis 869. Thus, the rotatable element 920 transfers torque from the engine 902 to the transmission 810, and allows the engine axis 912 and the transmission axis 869 to be arranged parallel with one another, both running laterally with respect to the vehicle 901, with the transmission axis 869, the transmission input member 812, and transmission output member 814 being aligned and coaxial with the front wheels 906, 908. The rotatable element 920 may be a chain or belt.

The gearing arrangement 816 is indicated only schematically in FIG. 10 as generally being in the area indicated by the dashed box, between the transmission input member 812 and the transmission output member 814, with the transmission input member 812 and transmission output member 814 connected for rotation with different members of the gearing arrangement 816 as shown and described with respect to FIG. 9A.

The driveline 904 further includes an additional planetary gear set 924, also referred to as a final drive planetary gear set, as well as a differential mechanism 926, each of which are arranged concentrically and coaxially with the transmission axis 869 and transfer torque from the transmission output member 814 to the wheels 906, 908 as described below. Although depicted as a bevel-type differential mechanism in FIG. 10, the differential mechanism 926 may alternatively be a compound planetary gear set.

The final drive planetary gear set 924 includes a sun gear member 932, a ring gear member 934 and a carrier member 936 that rotatably supports a plurality of pinion gears 937 that intermesh with both the sun gear member 932 and the ring gear member 934. The sun gear member 932 is connected for common rotation with the transmission output member 814. The ring gear member 934 is grounded to the transmission casing 880.

The differential mechanism 926 includes a carrier member 940 that rotates with and supports a pinion shaft 942 on which pinion gears 944 rotate commonly. The carrier member 940 is connected for common rotation with the carrier member 936 of the final drive planetary gear set 924 and is referred to herein as the first member of the differential gear set 926. The carrier member 940 also supports side gears 946 and 948, both of which mesh with the pinion gears 944. The side gear 946, referred to as the second member of the differential gear set 926, is connected for rotation with a drive shaft 950 which delivers driving torque to wheel 906 via wheel axle 951. The wheel axle 951 may be connected for common rotation with drive shaft 950 or may be integrally formed as a unitary component with the drive shaft 950. The side gear 948, referred to as the third member of the differential gear set 926, is connected for common rotation with a drive shaft 952 which delivers driving torque to wheel 908 via wheel axle 954. The wheel axle 954 may be connected for common rotation with drive shaft 952 or may be integrally formed as a unitary component with the drive shaft 952. Both of the drive shafts 950, 952 are concentric and coaxial with the transmission axis 869. The drive shaft 952 passes through a central opening in the sun gear member 932 of the final drive planetary gear set 924, the tubular transmission output member 814, the transmission gearing arrangement 816, the tubular transmission input member 812, and the rotatable element 920 and a central opening in the sprocket 922 before connecting for common rotation with wheel axle 954.

Accordingly, the driveline 904 is arranged to wrap around the engine 902, with the transmission 810 arranged on a transverse axis (transmission axis 869) parallel with an axis 912 of the engine 902, with the transmission input member 812 and the transmission output member 814 arranged at opposing ends of the transmission 810, coaxial with one another. The transmission 810 delivers torque to the front wheels 906, 908 at eight forward speed ratios and a reverse speed ratio by engaging five torque-transmitting mechanisms 860, 862, 864, 866 and 868 in various combinations. The torque-transmitting mechanisms 860, 862, 864, 866 and 868 may be located in a variety of different zones defined by the transmission 810, as described above. Thus, a compact front-wheel drive transmission 810 is conveniently packaged as part of a wrap-around driveline 904.

While the best modes for carrying out the invention have been described in detail, those familiar with the art to which this invention relates will recognize various alternative designs and embodiments for practicing the invention within the scope of the appended claims.

The invention claimed is:

1. A driveline for transferring torque from an engine output member of an engine to front wheels of a vehicle comprising:
   a transmission having:
      a transmission casing, a transmission input member, a transmission output member, and first, second, third and fourth planetary gear sets, each planetary gear set having a ring gear member, a sun gear member, and a carrier member rotatably supporting pinion gears intermeshing with both the ring gear member and the sun gear member; wherein the transmission input member and the transmission output member are aligned with one another and with the front wheels to thereby define a transmission axis about which the transmission input member and the transmission output member rotate;
      wherein the transmission axis is parallel with and spaced from an engine axis defined by the engine output member and about which the engine output member rotates; wherein the ring gear member of the first planetary gear set is continuously connected for common rotation with the sun gear member of the second planetary gear set; wherein the ring gear member of the second planetary gear set is continuously connected for common rotation with the carrier member of the third planetary gear set; wherein the ring gear member of the third planetary gear set is continuously connected for common rotation with the carrier member of the fourth planetary gear set; wherein the sun gear member of the third planetary gear set is continuously connected for common rotation with the sun gear member of the fourth planetary gear set; wherein the sun gear member of the first planetary gear set is grounded to the transmission casing;
      five torque-transmitting mechanisms for selectively interconnecting the members of the planetary gear sets with the stationary members or with other members of the planetary gear sets; wherein the torque-transmitting mechanisms are selectively engagable in different combinations to achieve eight forward speed ratios and a reverse speed ratio between the transmission input member and the transmission output member; and
   at least one rotatable element operable to transfer torque from the engine output member to the transmission input member; and
   an additional planetary gear set having a ring gear member, a sun gear member and a carrier member, one of the members of the additional planetary gear set being connected for common rotation with the transmission output member and each of the members of the additional planetary gear set being concentric about the transmission axis;
   a differential mechanism having a first, a second and a third member; wherein the first member of the differential mechanism is connected for common rotation with one of the members of the additional planetary gear set that is not connected for common rotation with the transmission output member; wherein the second member of the differential mechanism is connected for common rotation with a first of the front wheels;
   a drive shaft running coaxial with the transmission axis through the first, second, third and fourth planetary gear sets; and wherein the third member of the differential mechanism is connected for common rotation with a second of the front wheels via the drive shaft.

2. The driveline of claim 1, wherein the five torque-transmitting mechanisms include:
   a first torque-transmitting mechanism selectively engagable to ground the ring gear member of the fourth planetary gear set to the transmission casing;
   a second torque-transmitting mechanism selectively engagable to connect the ring gear member of the first planetary gear set for common rotation with the sun gear member of the third planetary gear set;
   a third torque-transmitting mechanism selectively engagable to connect the carrier member of the first planetary gear set for common rotation with the carrier member of the second planetary gear set;
   a fourth torque-transmitting mechanism selectively engagable to connect the carrier member of the first planetary gear set for common rotation with the sun gear member of the third planetary gear set; and
   a fifth torque-transmitting mechanism selectively engagable to connect the carrier member of the second planetary gear set for common rotation with the ring gear member of the fourth planetary gear set.

3. The driveline of claim 2, wherein the transmission casing has a first end wall, a second end wall, and a housing portion interconnecting the first end wall and the second end wall; wherein the end walls and the housing portion define a cavity;
   wherein the transmission casing and the planetary gear sets define six zones within the cavity, including a first zone extending axially from the first end wall to the first planetary gear set and extending radially to an outer periphery of the planetary gear sets; a second zone extending axially from the first planetary gear set to the second planetary gear set and extending radially to the outer periphery of the planetary gear sets, a third zone extending axially from the second planetary gear set to the third planetary gear set and extending radially to the outer periphery of the planetary gear sets, a fourth zone extending axially from the third planetary gear set to the fourth planetary gear set and extending radially to the outer periphery of the planetary gear sets, a fifth zone extending axially from the fourth planetary gear set to the second end wall and extending radially to the outer periphery of the planetary gear sets, and a sixth zone bordering the first, second, third, fourth and fifth zones and extending radially outward to the housing portion and axially between the first and second walls; and wherein the first torque-transmitting mechanism is located in one of the first, second, fifth and sixth zones; wherein the second torque-transmitting mechanism is located in one of the second, third, and sixth zones; wherein the third torque-transmitting mechanism is located in one of the first, second, and sixth zones; wherein the fourth torque-transmitting mechanism is located in one of the first, second, third, and fifth zones; and wherein the fifth torque-transmitting mechanism is located in one of the first, second, third, fifth, and sixth zones.

4. A driveline for transferring torque from an engine output member of an engine to front wheels of a vehicle comprising:
a transmission having:
  a transmission casing having a first end wall, a second end wall, and a housing portion interconnecting the first end wall and the second end wall; wherein the end walls and the housing portion define a cavity;
  a transmission input member;
  a transmission output member; wherein the transmission input member and the transmission output member are aligned with one another and with the front wheels to thereby define a transmission axis about which the transmission input member and the transmission output member rotate; wherein the transmission axis is parallel with and spaced from an engine axis defined by the engine output member and about which the engine output member rotates;
  first, second, third and fourth planetary gear sets within the cavity, each planetary gear set having a ring gear member, a sun gear member, and a carrier member rotatably supporting pinion gears intermeshing with both the ring gear member and the sun gear member;
wherein the transmission casing and the first, second, third and fourth planetary gear sets define six zones within the cavity, including a first zone extending axially from the first end wall to the first planetary gear set and extending radially to an outer periphery of the first, second, third and fourth planetary gear sets, a second zone extending axially from the first planetary gear set to the second planetary gear set and extending radially to the outer periphery of the first, second, third and fourth planetary gear sets, a third zone extending axially from the second planetary gear set to the third planetary gear set and extending radially to the outer periphery of the first, second, third and fourth planetary gear sets, a fourth zone extending axially from the third planetary gear set to the fourth planetary gear set and extending radially to the outer periphery of the first, second, third and fourth planetary gear sets, a fifth zone extending axially from the fourth planetary gear set to the second end wall and extending radially to the outer periphery of the first, second, third and fourth planetary gear sets, and a sixth zone bordering the first, second, third, fourth and fifth zones and extending radially outward to the housing portion and axially between the first and second walls;
wherein the ring gear member of the first planetary gear set is continuously connected for common rotation with the sun gear member of the second planetary gear set;
wherein the ring gear member of the second planetary gear set is continuously connected for common rotation with the carrier member of the third planetary gear set;
wherein the ring gear member of the third planetary gear set is continuously connected for common rotation with the carrier member of the fourth planetary gear set;
wherein the sun gear member of the third planetary gear set is continuously connected for common rotation with the sun gear member of the fourth planetary gear set;
wherein the sun gear member of the first planetary gear set is grounded to the transmission casing;
five torque-transmitting mechanisms for selectively interconnecting the members of the planetary gear sets with the stationary members or with other members of the planetary gear sets; wherein the torque-transmitting mechanisms are selectively engagable in different combinations to achieve eight forward speed ratios and a reverse speed ratio between the transmission input member and the transmission output member; and
at least one rotatable element operable to transfer torque from the engine output member to the transmission input member; and
an additional planetary gear set having a ring gear member, a sun gear member and a carrier member, one of the members of the additional planetary gear set being connected for common rotation with the transmission output member and each of the members of the additional planetary gear set being concentric about the transmission axis;
a differential mechanism having a first, a second and a third member; wherein the first member of the differential mechanism is connected for common rotation with one of the members of the additional planetary gear set that is not connected for common rotation with the transmission output member; wherein the second member of the differential mechanism is connected for common rotation with a first of the front wheels;
a drive shaft running coaxial with the transmission axis through the first, second, third and fourth planetary gear sets; and wherein the third member of the differential mechanism is connected for common rotation with a second of the front wheels via the drive shaft.

5. The driveline of claim 4, wherein the at least one rotatable element is an endless transfer element.

6. The driveline of claim 4, wherein the five torque-transmitting mechanisms include:
  a first torque-transmitting mechanism selectively engagable to ground the ring gear member of the fourth planetary gear set to the transmission casing;
  a second torque-transmitting mechanism selectively engagable to connect the ring gear member of the first planetary gear set for common rotation with the sun gear member of the third planetary gear set;
  a third torque-transmitting mechanism selectively engagable to connect the carrier member of the first planetary gear set for common rotation with the carrier member of the second planetary gear set;
  a fourth torque-transmitting mechanism selectively engagable to connect the carrier member of the first planetary gear set for common rotation with the sun gear member of the third planetary gear set;
  a fifth torque-transmitting mechanism selectively engagable to connect the carrier member of the second planetary gear set for common rotation with the ring gear member of the fourth planetary gear set;
wherein the first torque-transmitting mechanism is located in one of the first, second, fifth and sixth zones; wherein the second torque-transmitting mechanism is located in one of the second, third, and sixth zones; wherein the third torque-transmitting mechanism is located in one of the first, second, and sixth zones; wherein the fourth torque-transmitting mechanism is located in one of the first, second, third, and fifth zones; and wherein the fifth torque-transmitting mechanism is located in one of the first, second, third, fifth, and sixth zones.

7. The driveline of claim 6, wherein the first torque-transmitting mechanism is located in the sixth zone; wherein the second torque-transmitting mechanism is located in the second zone; wherein the third torque-transmitting mechanism is located in the sixth zone; wherein the fourth torque-transmitting mechanism is located in the second zone; and wherein the fifth torque-transmitting mechanism is located in the sixth zone.

8. The driveline of claim 6, wherein the first torque-transmitting mechanism is located in the first zone.

9. The driveline of claim 6, wherein the first torque-transmitting mechanism is located in the second zone.

10. The driveline of claim 6, wherein the first torque-transmitting mechanism is located in the fifth zone.

11. The driveline of claim 6, wherein the first torque-transmitting mechanism is located in the sixth zone.

12. The driveline of claim 6, wherein the second torque-transmitting mechanism is located in the second zone.

13. The driveline of claim 6, wherein the second torque-transmitting mechanism is located in the third zone.

14. The driveline of claim 6, wherein the second torque-transmitting mechanism is located in the sixth zone.

15. The driveline of claim 6, wherein the third torque-transmitting mechanism is located in the first zone.

16. The driveline of claim 6, wherein the third torque-transmitting mechanism is located in the second zone.

17. The driveline of claim 6, wherein the third torque-transmitting mechanism is located in the sixth zone.

18. The driveline of claim 6, wherein the fourth torque-transmitting mechanism is located in the first zone.

19. The driveline of claim 6, wherein the fourth torque-transmitting mechanism is located in the second zone.

20. The driveline of claim 6, wherein the fourth torque-transmitting mechanism is located in the third zone.

21. The driveline of claim 6, wherein the fourth torque-transmitting mechanism is located in the fifth zone.

22. The driveline of claim 6, wherein the fifth torque-transmitting mechanism is located in the first zone.

23. The driveline of claim 6, wherein the fifth torque-transmitting mechanism is located in the second zone.

24. The driveline of claim 6, wherein the fifth torque-transmitting mechanism is located in the third zone.

25. The driveline of claim 6, wherein the fifth torque-transmitting mechanism is located in the fifth zone.

26. The driveline of claim 6, wherein the fifth torque-transmitting mechanism is located in the sixth zone.

* * * * *